(12) United States Patent
Saori

(10) Patent No.: US 7,301,711 B2
(45) Date of Patent: Nov. 27, 2007

(54) FAST ZOOM LENS SYSTEM

(75) Inventor: Masakazu Saori, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 11/556,740

(22) Filed: Nov. 6, 2006

(65) Prior Publication Data

US 2007/0103795 A1 May 10, 2007

(30) Foreign Application Priority Data

Nov. 7, 2005 (JP) ............................ P2005-322558

(51) Int. Cl.
*G02B 15/14* (2006.01)
(52) U.S. Cl. ..................... 359/687; 359/715; 359/740; 359/774
(58) Field of Classification Search ................ 359/687, 359/715, 740, 774
See application file for complete search history.

(56) References Cited

U.S. PATENT DOCUMENTS

| | | | |
|---|---|---|---|
| 6,519,094 B1 * | 2/2003 | Boku et al. | ................. 359/687 |
| 2004/0125462 A1 | 7/2004 | Misaka | |
| 2005/0013015 A1 | 1/2005 | Sensui | |
| 2006/0061873 A1 | 3/2006 | Saori | |
| 2006/0139768 A1 | 6/2006 | Saori | |
| 2007/0002456 A1 | 1/2007 | Saori | |

FOREIGN PATENT DOCUMENTS

| | | |
|---|---|---|
| JP | 2003-84198 | 3/2003 |
| JP | 2004-101739 | 4/2004 |
| JP | 2004-198529 | 7/2004 |
| JP | 2005-49843 | 2/2005 |
| JP | 2005-181556 | 7/2005 |

OTHER PUBLICATIONS

U.S. Appl. No. 11/550,118 to Saori, which was filed on Oct. 17, 2006.
U.S. Appl. No. 11/565,735 to Saori, which was filed on Dec. 1, 2006.
English language abstract of JP 2003-84198.
English language abstract of JP 2004-101739.
English language abstract of JP 2005-181556.

* cited by examiner

*Primary Examiner*—Evelyn A. Lester
(74) *Attorney, Agent, or Firm*—Greenblum & Bernstein, P.L.C.

(57) ABSTRACT

A fast zoom lens system includes a positive first lens group, a negative second lens group, a positive third lens group and a positive fourth lens group, in this order from the object.

Upon zooming from the short focal length extremity to the long focal length extremity, a distance between the positive first lens group and the negative second lens group increases, a distance between the negative second lens group and the positive third lens group decreases, and a distance between the positive third lens group and the positive fourth lens group decreases.

The fast zoom lens system satisfies the following conditions;

$$6.0 < f1/fw < 10.0 \quad (1)$$

$$3.0 < f3/fw < 8.0 \quad (2)$$

wherein
f1 designates the focal length of the positive first lens group;
f3 designates the focal length of the positive third lens group; and
fw designates the focal length of the entire fast zoom lens system at the short focal length extremity.

12 Claims, 13 Drawing Sheets

Fig.1
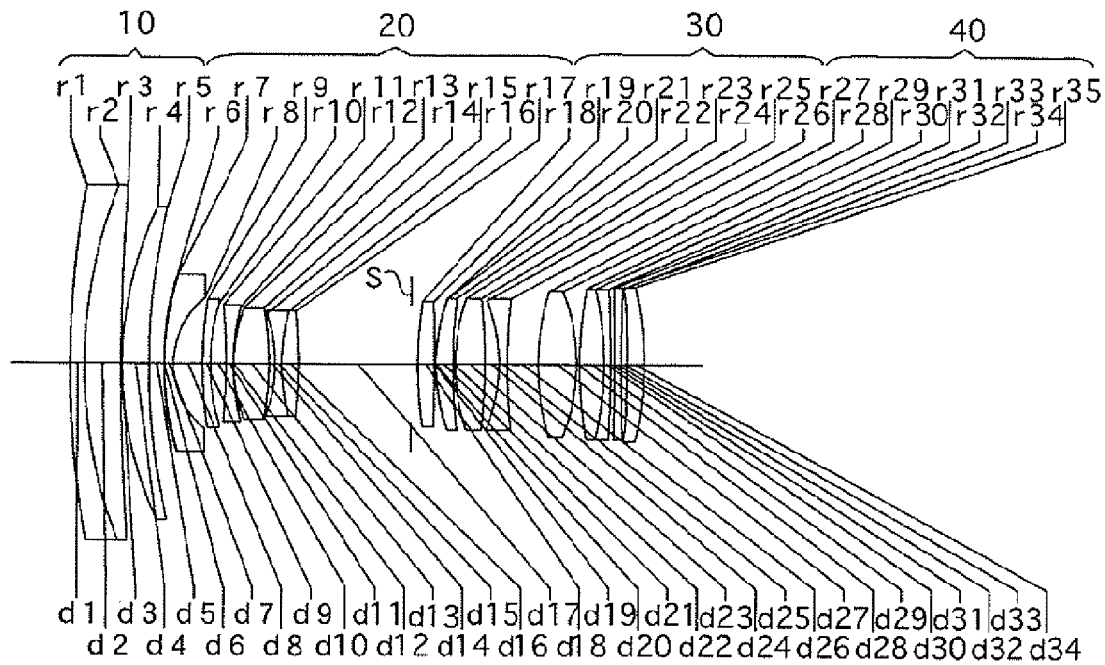
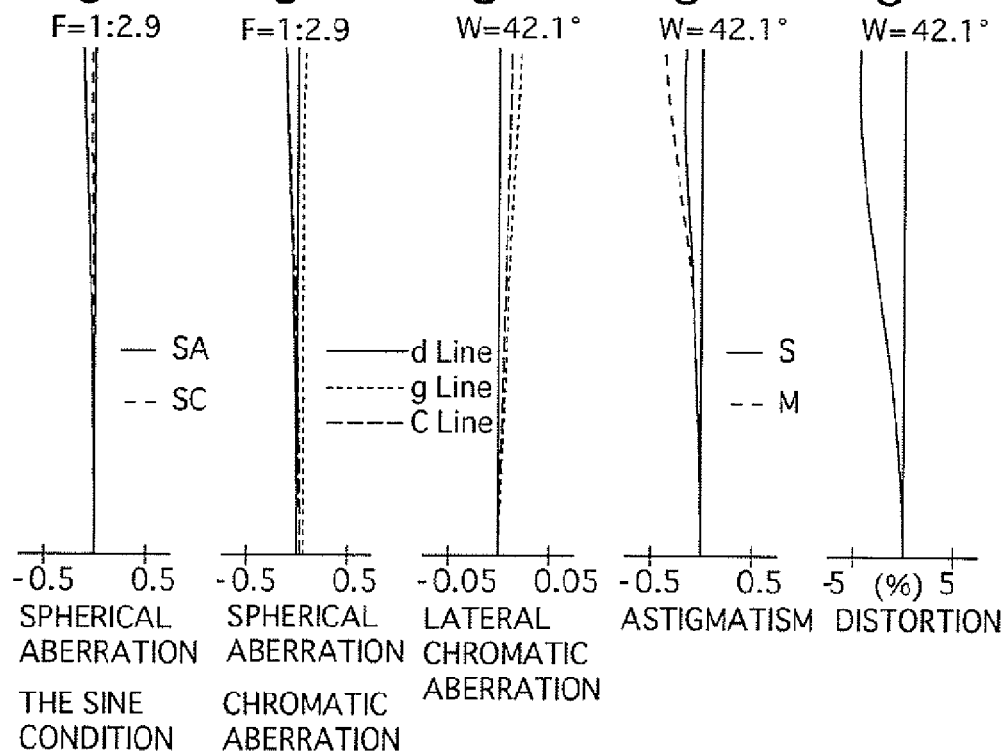
Fig.2A  F=1:2.9  SPHERICAL ABERRATION THE SINE CONDITION — SA  -- SC
Fig.2B  F=1:2.9  SPHERICAL CHROMATIC ABERRATION — d Line  ···· g Line  ---- C Line
Fig.2C  W=42.1°  LATERAL CHROMATIC ABERRATION
Fig.2D  W=42.1°  ASTIGMATISM — S  -- M
Fig.2E  W=42.1°  DISTORTION Fig.7
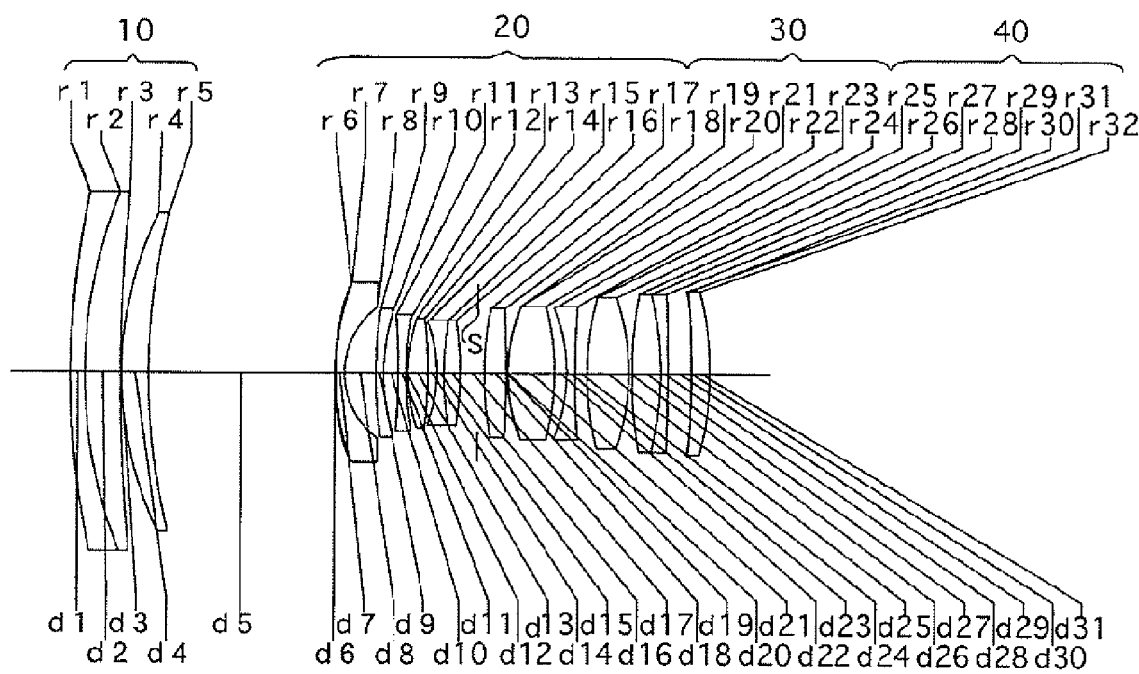
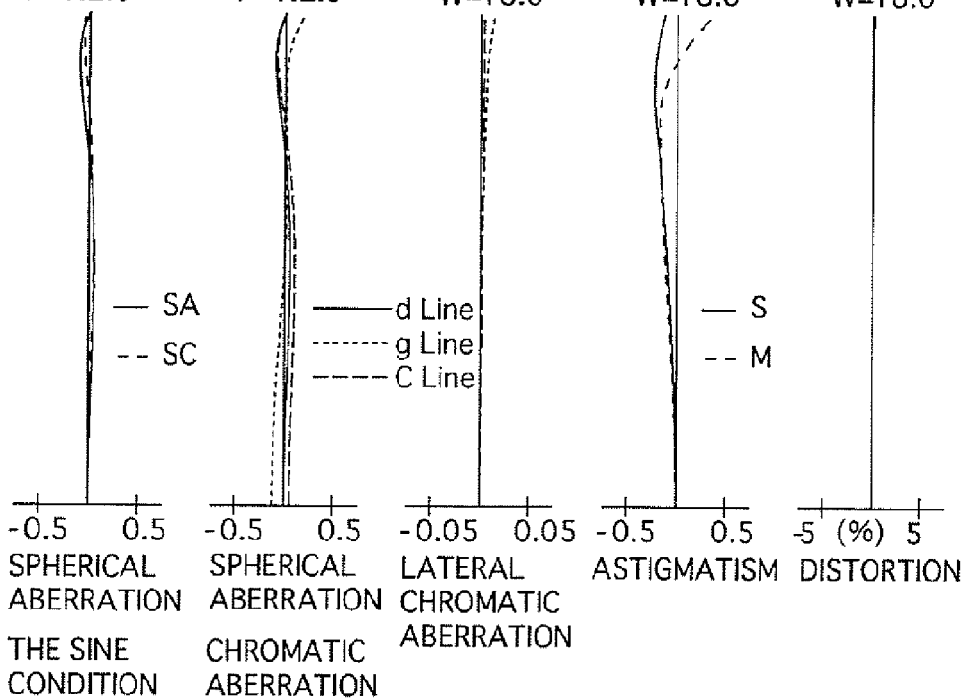
Fig.8A  Fig.8B  Fig.8C  Fig.8D  Fig.8E
F=1:2.9  F=1:2.9  W=18.0°  W=18.0°  W=18.0°
— SA
-- SC
—— d Line
----- g Line
------ C Line
— S
-- M
-0.5  0.5     -0.5  0.5     -0.05  0.05    -0.5  0.5    -5 (%) 5
SPHERICAL     SPHERICAL     LATERAL        ASTIGMATISM  DISTORTION
ABERRATION    ABERRATION    CHROMATIC
              CHROMATIC     ABERRATION
THE SINE      ABERRATION
CONDITION

Fig.9
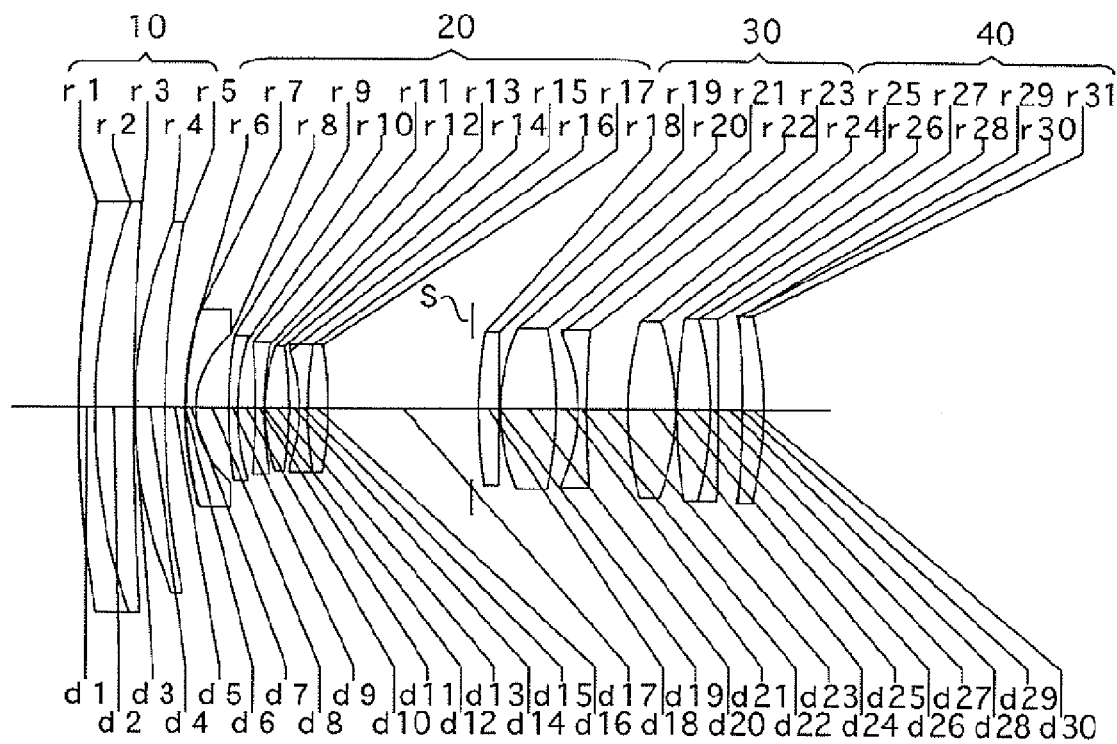
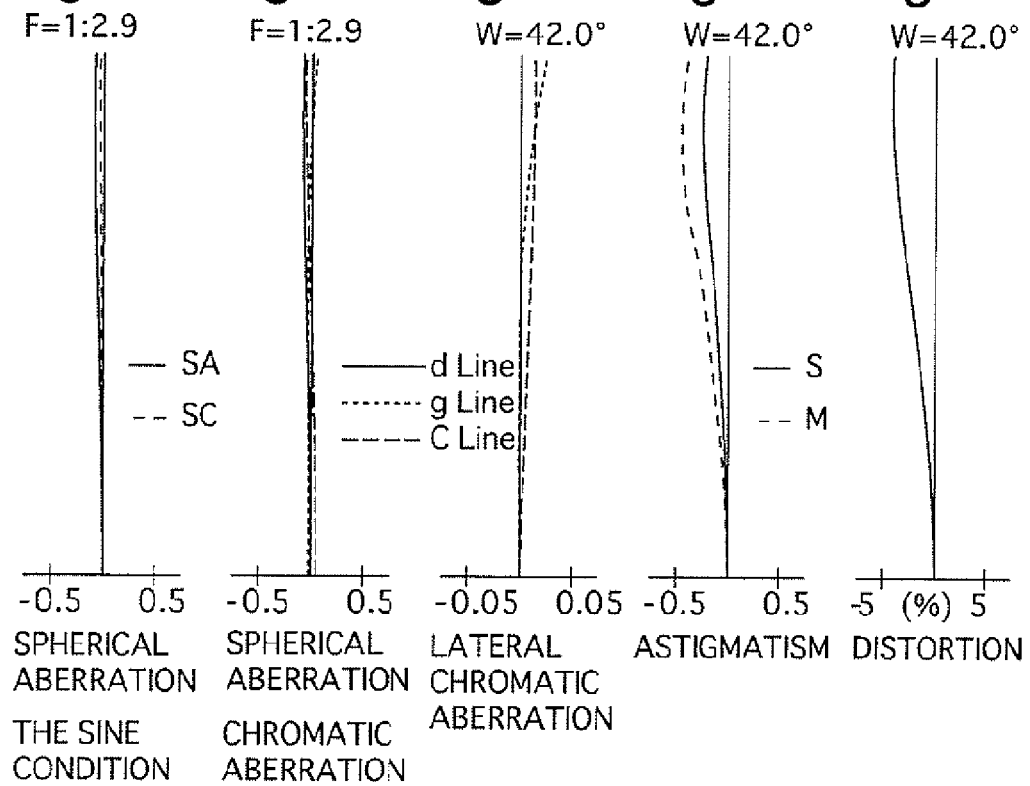
Fig.10A  Fig.10B  Fig.10C  Fig.10D  Fig.10E

Fig. 13
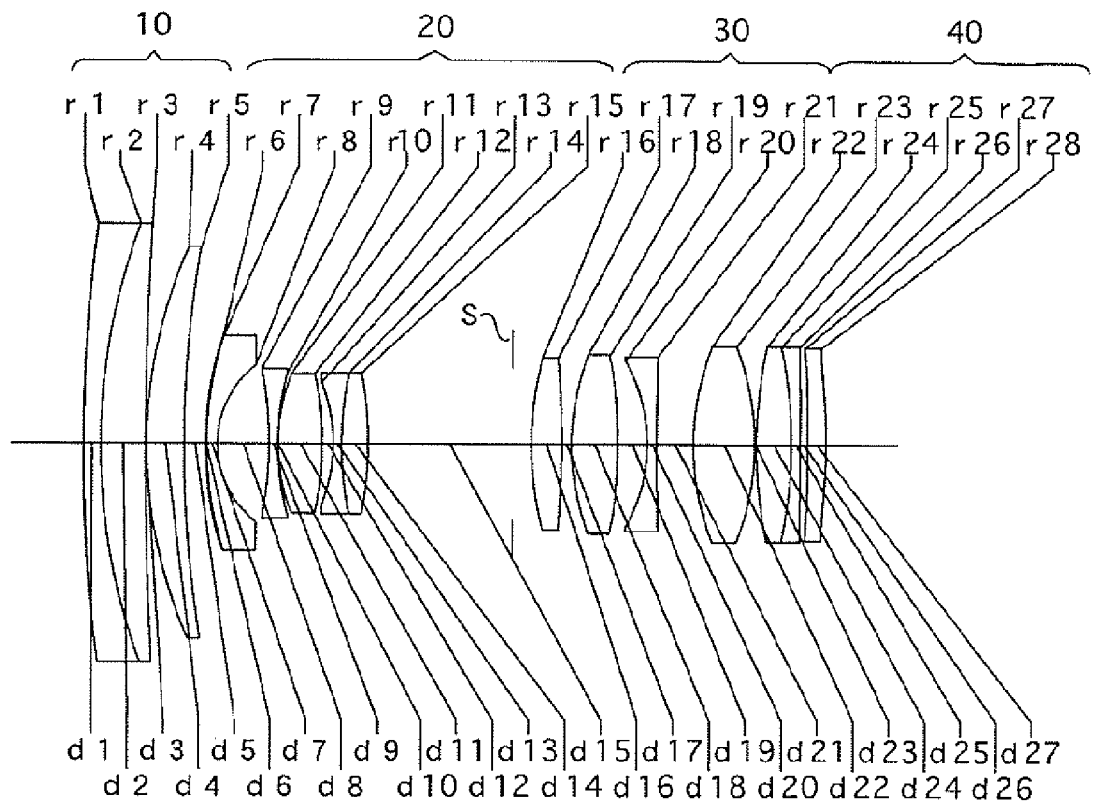
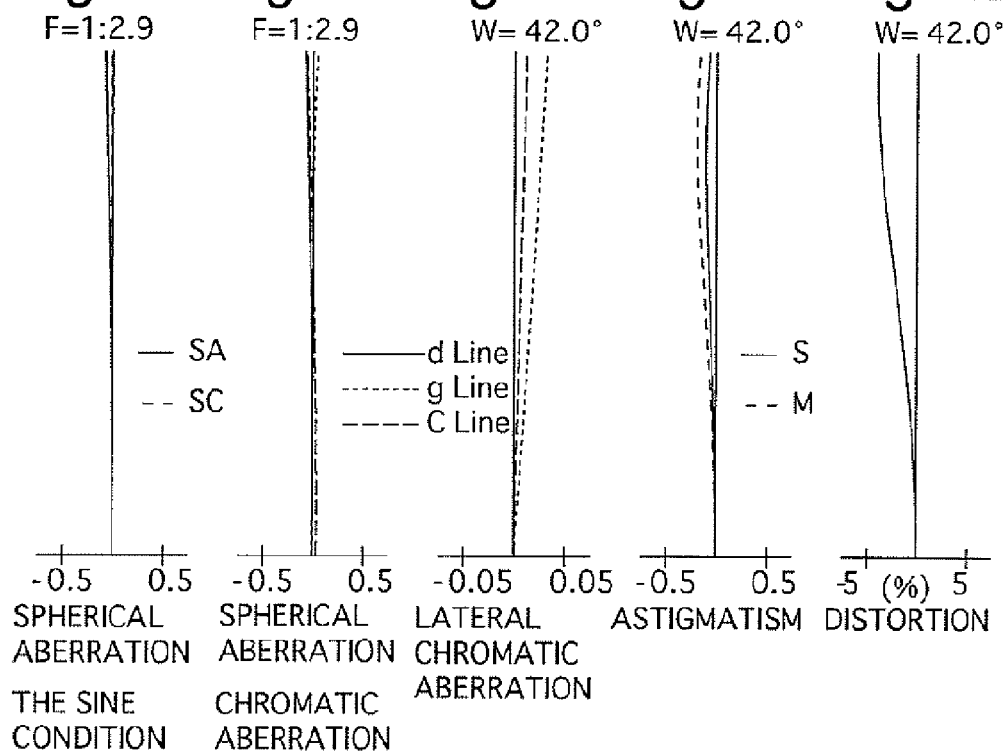

Fig. 17
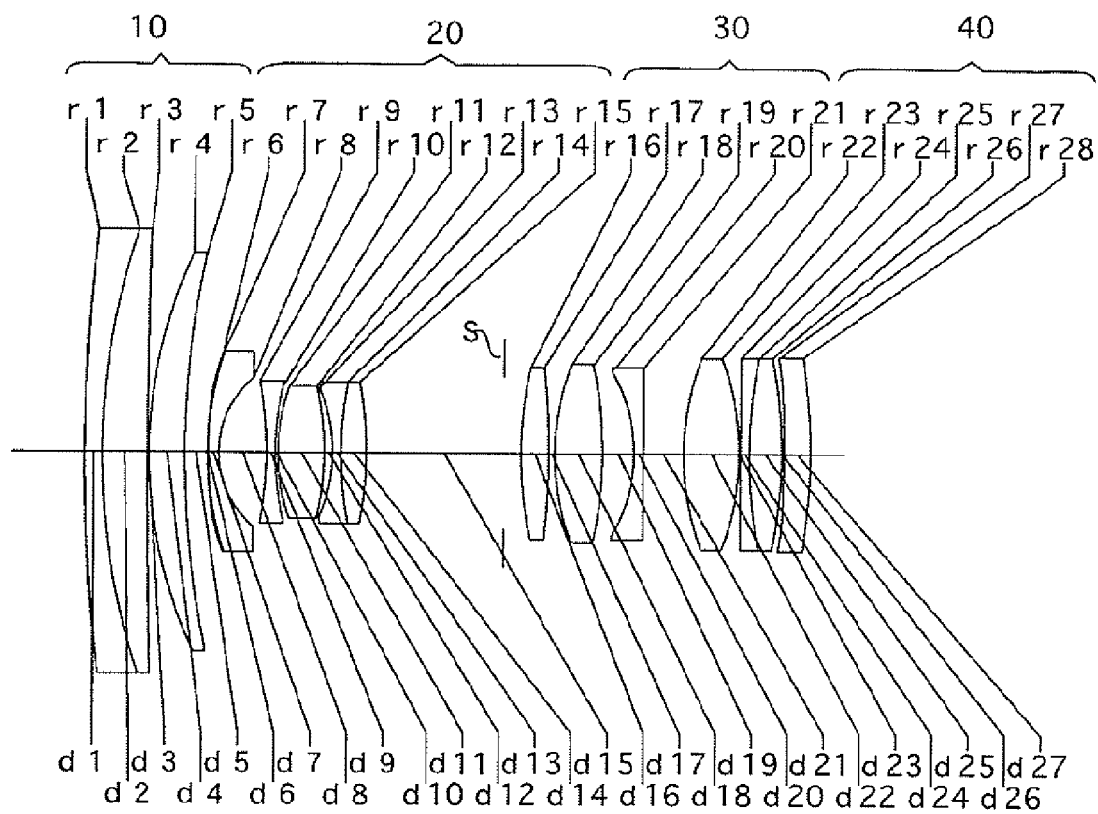
Fig.18A  Fig.18B  Fig.18C  Fig.18D  Fig.18E
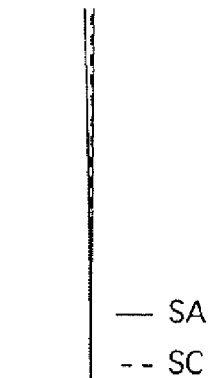  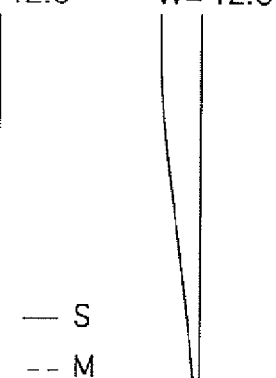
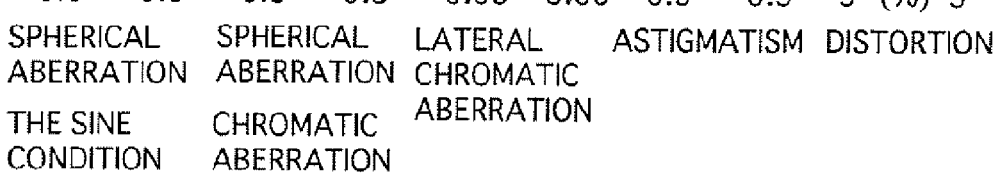

Fig.19
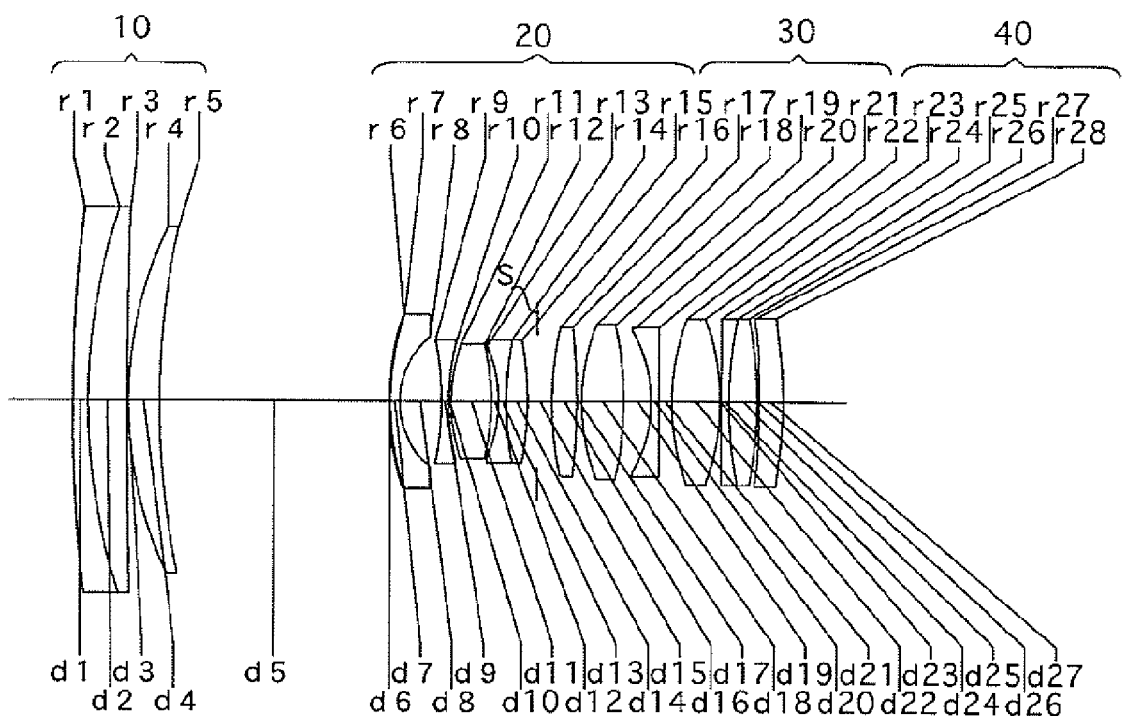
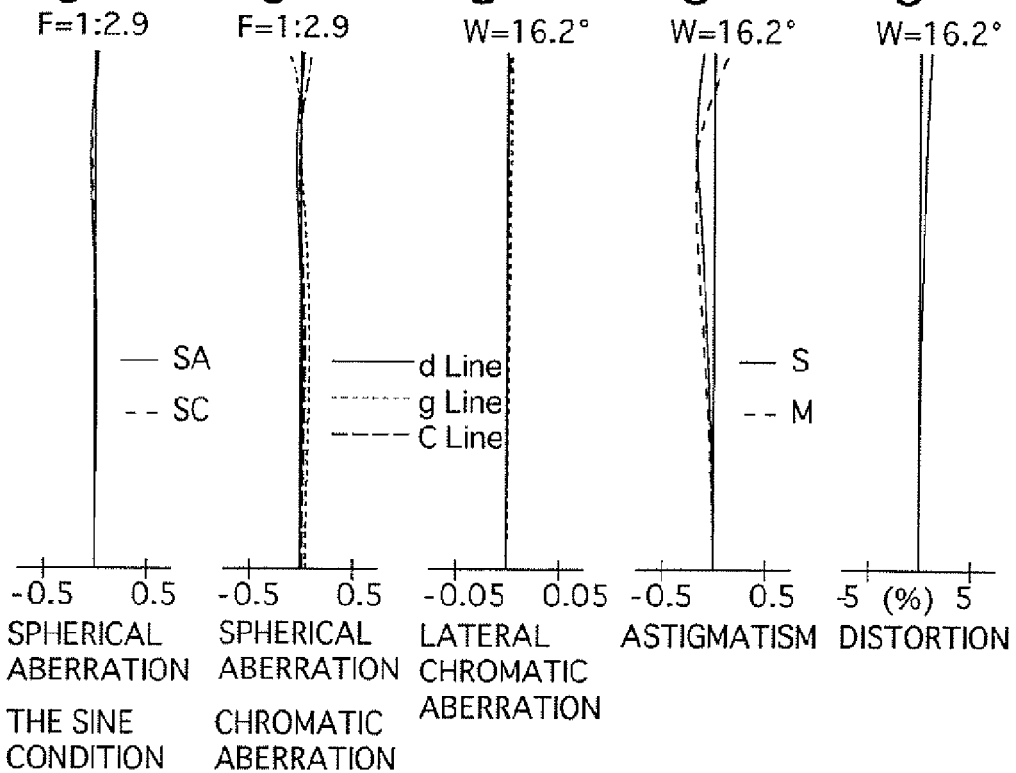

Fig.21
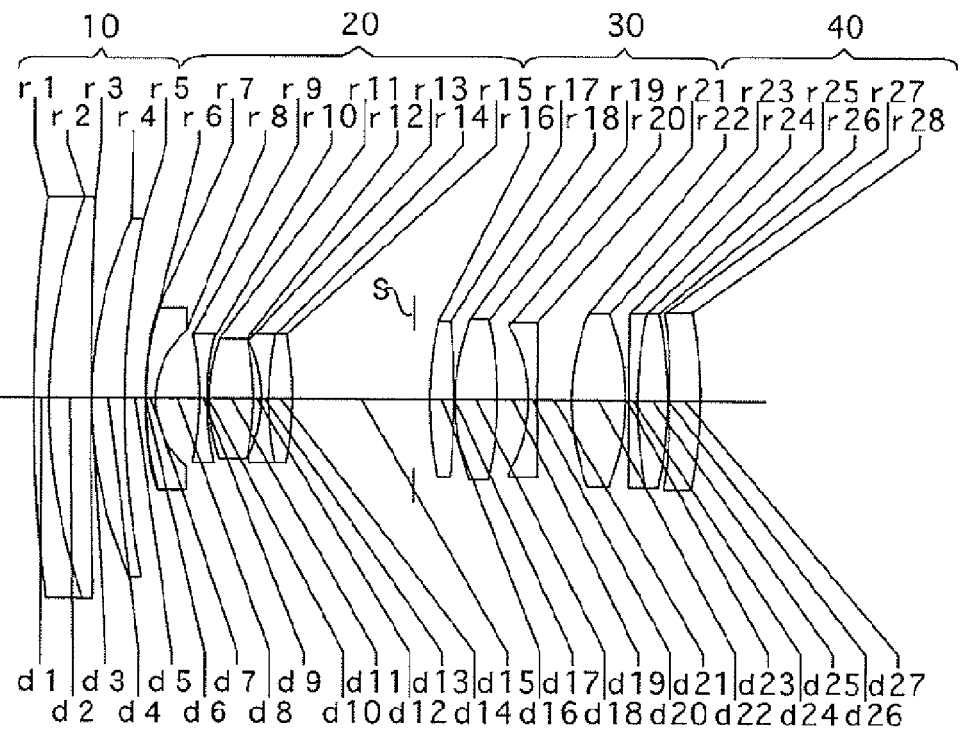
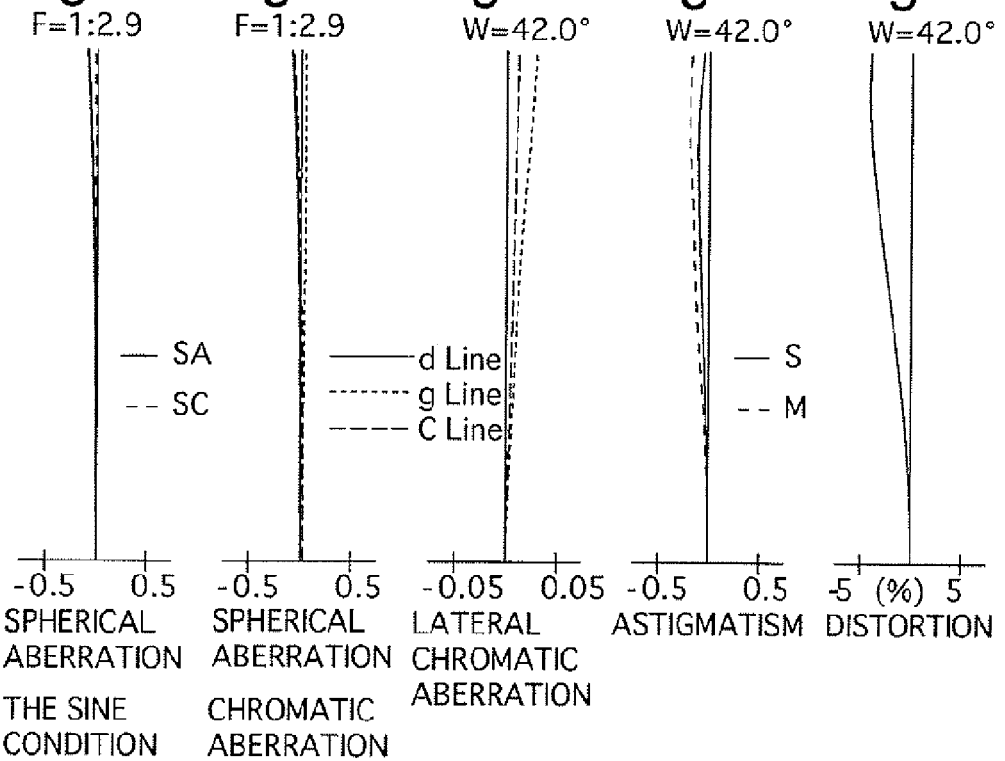

FAST ZOOM LENS SYSTEM

BACKGROUND OF THE INVENTION

1. Field of the Invention

The present invention relates to a fast zoom lens system which is suitable for a single lens reflex (SLR) camera, and particularly suitable for adigital SLR camera.

2. Description of the Prior Art

A conventional fast zoom lens system of a negative-lead type, in which a lens group having a negative refractive power is positioned at the most object-side therein, has been advantageous in achieving higher quality photo-images. Therefore varieties of such a negative-lead type fast zoom lens system have been proposed.

For example, in Japanese Unexamined Patent Publication (hereinafter, JUPP) No. 2004-198529, JUPP No. 2003-84198 and JUPP No. 2005-49843, a fast zoom lens system of four lens-groups arrangement, i.e., a lens group with a negative refractive power, a lens group with appositive refractive power, a lens group with a negative refractive power and a lens group with a positive refractive power, in this order from the object, have been proposed.

Alternatively, a conventional positive-lead type fast zoom lens systems of four lens-groups arrangement, i.e., a lens group with a positive refractive power, a lens group with a negative refractive power, a lens group with appositive refractive power and a lens group with a positive refractive power, in this order from the object, has been proposed in, e.g., JUPP No. 2004-101739. A fast zoom lens system of this positive-lead type has been advantageous for miniaturizing both overall length and lens diameters of the fast zoom lens system.

A negative-lead type fast zoom lens system, however, tends to be heavier. On the other hand, a positive-lead type fast zoom lens system is advantageous for miniaturization, while it is difficult for a positive-lead type fast zoom lens system to secure a sufficient back focal distance.

In a digital SLR camera, the size of an image sensor thereof is smaller than the film-frame size of a silver-halide film SLR camera, so that the focal length with respect to a predetermined angle-of-view becomes shorter.

Therefore if an attempt is made to make a conventional lens system designed for a silver-halide film SLR camera compatible with the digital SLR camera, it is necessary to make the flange-back of the digital SLR camera longer so as to be substantially the same as that of a silver-halide film SLR camera. Consequently, a longer back focal distance with respect to a shorter focal length is necessary in order to achieve a lens system of a wider-angle (shorter focal length).

SUMMARY OF THE INVENTION

The present invention is to provide a small and high-quality fast zoom lens system of a four-lens-group arrangement, i.e., a lens group with a positive refractive power, a lens group with a negative refractive power, a lens group with a positive refractive power and a lens group with a positive refractive power, in this order from the object which is suitable for a digital SLR camera. The fast zoom lens system is arranged to have the following features:

an angle-of-view of approximately 85° at the short focal length extremity and approximately 32° at the long focal length extremity;

a zoom ratio of approximately 2.6 to 3; and a longer back focal distance.

According to an aspect of the present invention, there is provided a fast zoom lens system including a first lens group having a positive refractive power (hereinafter, a positive first lens group), a second lens group having a negative refractive power (hereinafter, a negative second lens group), a third lens group having a positive refractive power (hereinafter, a positive third lens group) and a fourth lens group having a positive refractive power (hereinafter, a positive fourth lens group), in this order from the object.

Upon zooming from the short focal length extremity to the long focal length extremity, a distance between the positive first lens group and the negative second lens group increases a distance between the negative second lens group and the positive third lens group decreases, and a distance between the positive third lens group and the positive fourth lens group decreases.

The fast zoom lens system satisfies the following conditions:

$$6.0 < f1/fw < 10.0 \quad (1)$$

$$3.0 < f3/fw < 8.0 \quad (2)$$

wherein f1 designates the focal length of the positive first lens group;

f3 designates the focal length of the positive third lens group; and fw designates the focal length of the entire fast zoom lens system at the short focal length extremity.

The fast zoom lens system preferably satisfies the following conditions:

$$7.0 < f1/|f2| < 10.0 \quad (3)$$

$$2.0 < f3/f4 < 5.0 \quad (4)$$

wherein f1 designates the focal length of the positive first lens group;

f2 designates the focal length of the negative second lens group;

f3 designates the focal length of the positive third lens group; and f4 designates the focal length of the positive fourth lens group.

The fast zoom lens system preferably satisfies the following condition:

$$f1 \times f4 < (f3) \quad (5)$$

wherein f1 designates the focal length of the positive first lens group;

f3 designates the focal length of the positive third lens group; and f4 designates the focal length of the positive fourth lens group.

According to another aspect of the present invention, there is provided a fast zoom lens system including, a positive first lens group, a negative second lens group, a positive third lens group and a positive fourth lens group, in this order from the object.

Upon zooming from the short focal length extremity to the long focal length extremity, a distance between the positive first lens group and the negative second lens group increases, a distance between the negative second lens group and the positive third lens group decreases, and a distance between the positive third lens group and the positive fourth lens group decreases.

The fast zoom lens system satisfies the following conditions:

$$7.0 < |f1/f2| < 10.0 \quad (3)$$

$$2.0 < f3/f4 < 5.0 \quad (4)$$

wherein f1 designates the focal length of the positive first lens group;

f2 designates the focal length of the negative second lens group;

f3 designates the focal length of the positive third lens group; and f4 designates the focal length of the positive fourth lens group.

The fast zoom lens system preferably satisfies the following condition:

$$f1 \times f4 < (f3)^2 \quad (5)$$

wherein f1 designates the focal length of the positive first lens group;

f3 designates the focal length of the positive third lens group; and f4 designates the focal length of the positive fourth lens group.

According to a further aspect of the present invention, there is provided a fast zoom lens system including a positive first lens group, a negative second lens group, a positive third lens group and a positive fourth lens group, in this order from the object.

Upon zooming from the short focal length extremity to the long focal length extremity, a distance between the positive first lens group and the negative second lens group increases, a distance between the negative second lens group and the positive third lens group decreases, and a distance between the positive third lens group and the positive fourth lens group decreases.

The fast zoom lens system satisfies the following condition:

$$f1 \times f4 < (f3)^2 \quad (5)$$

wherein f1 designates the focal length of the positive first lens group;

f3 designates the focal length of the positive third lens group; and f4 designates the focal length of the positive fourth lens group.

In the above fast zoom lens systems, the positive fourth lens group preferably includes three positive lens elements. Furthermore, it is preferable that at least one of the three positive lens element be bonded to a negative lens element.

More specifically, the positive fourth lens group preferably includes a positive lens element, cemented lens elements having a positive lens element and a negative lens element (or, a negative lens element and a positive lens element), and a positive lens group, in this order from the object.

Still further, it is preferable that the most image-side lens element of the positive fourth lens group be a positive lens element having at least one aspherical surface thereon.

The present disclosure relates to subject matter contained in Japanese Patent Application No. 2005-322558 (filed on Nov. 7, 2005) which is expressly incorporated herein in its entirety.

BRIEF DESCRIPTION OF THE DRAWINGS

The present invention will be discussed below in detail with reference to the accompanying drawings, in which:

FIG. 1 is a lens arrangement of the fast zoom lens system, at the short focal length extremity, according to a first embodiment of the present invention;

FIGS. 2A, 2B, 2C, 2D and 2E show aberrations occurred in the lens arrangement shown in FIG. 1;

FIG. 7 is a lens arrangement of the fast zoom lens system, at the long focal length extremity, according to the second embodiment of the present invention;

FIGS. 8A, 8B, 8C, 8D and 8E show aberrations occurred in the lens arrangement shown in FIG. 7;

FIG. 9 is a lens arrangement of the fast zoom lens system, at the short focal length extremity, according to a third embodiment of the present invention;

FIGS. 10A, 10B, 10C, 10D and 10E show aberrations occurred in the lens arrangement shown in FIG. 9;

FIG. 13 is a lens arrangement of the fast zoom lens system, at the short focal length extremity, according to a fourth embodiment of the present invention;

FIGS. 14A, 14B, 14C, 14D and 14E show aberrations occurred in the lens arrangement shown in FIG. 13;

FIG. 17 is a lens arrangement of the fast zoom lens system, at the short focal length extremity, according to a fifth embodiment of the present invention;

FIGS. 18A, 18B, 18C, 18D and 18E show aberrations occurred in the lens arrangement shown in FIG. 17;

FIG. 19 is a lens arrangement of the fast zoom lens system, at the long focal length extremity, according to the fifth embodiment of the present invention;

FIGS. 20A, 20B, 20C, 20D and 20E show aberrations occurred in the lens arrangement shown in FIG. 19;

FIG. 21 is a lens arrangement of the fast zoom lens system, at the short focal length extremity, according to a sixth embodiment of the present invention;

FIGS. 22A, 22B, 22C, 22D and 22E show aberrations occurred in the lens arrangement shown in FIG. 21;

DESCRIPTION OF THE PREFERRED EMBODIMENTS

Figure 25:
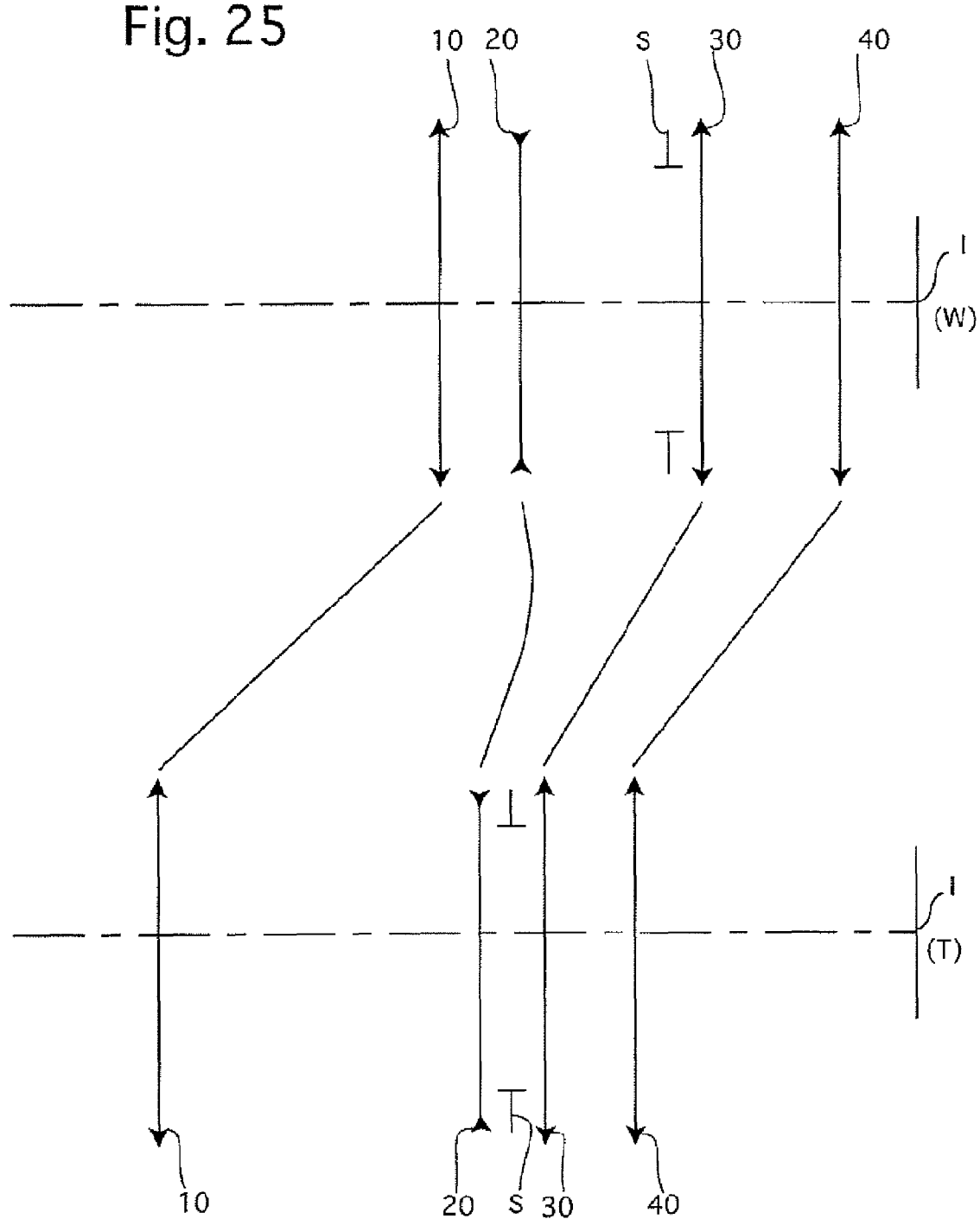
FIG. 25 is the schematic view of the lens-group moving paths for the fast zoom lens system according to the present invention.

The fast zoom lens system of the present invention, as shown in the zoom path of FIG. 25, includes a positive first lens group 10, a negative second lens group 20, a diaphragm S, a positive third lens group 30, and a positive fourth lens group 40, in this order from the object.

Upon zooming from the short focal length extremity (W) to the long focal length extremity (T), the positive first lens group 10, the positive third lens group 30 and the positive fourth lens group 40 move monotonically toward the object; and the negative second lens group 20 first moves toward the image, and thereafter moves toward the object.

While the zooming is being performed, the distance between the positive first lens group 10 and the negative second lens group 20 increases; the distance between the negative second lens group 20 and the positive third lens group 30 decreases; the distance between the positive third lens group 30 and the positive fourth lens group 40 decreases; and the distance between the positive fourth lens group 40 and the image plane monotonically increases.

A diaphragm S is provided in front of the positive third lens group 30, and is arranged to move together with the positive third lens group 30.

Condition (1) specifies the ratio of the focal length of the positive first lens group 10 to the focal length of the entire fast zoom lens system at the short focal length extremity.

If f1/fw exceeds the upper limit of condition (1), the traveling distance of the positive fist lens group 10 upon zooming becomes longer. Consequently, the size of the entire fast zoom lens system becomes larger.

If f1/fw exceeds the lower limit of condition (1), the positive refractive power of the positive first lens group 10 becomes stronger. Consequently, spherical aberration and coma occur largely at the long focal length extremity in particular.

More preferably, the fast zoom lens system satisfies the following condition:

$$7.0 < f1/fw < 10.0 \quad (1')$$

Condition (2) specifies the ratio of the focal length of the positive third lens group 30 to the focal length of the entire fast zoom lens system at the short focal length extremity.

If f3/fw exceeds the upper limit of condition (3), the positive refractive power of the positive third lens group 30 becomes weaker, so that the positive refractive power of the positive fourth lens group 40 has to be made stronger. Consequently, it is difficult to correct the following aberrations, i.e., spherical aberration, coma, astigmatism and distortion, in a well balanced manner.

If f3/fw exceeds the lower limit of condition (3), the positive refractive power of the positive third lens group 30 becomes stronger. Consequently, spherical aberration, coma and astigmatism largely occur.

More preferably, the fast zoom lens system satisfies the following condition:

$$4.0 < f3/fw < 8.0 \quad (2')$$

Condition (3) specifies the ratio of the focal length of the positive first lens group 10 to the focal length of the negative second lens group 20.

If f1/|f2| exceeds the upper limit of condition (3), astigmatism and distortion largely occur at the short focal length extremity. Moreover, the traveling distance of the positive first lens group 10 upon zooming becomes longer, so that miniaturization of the fast zoom lens system becomes difficult.

If f1/|f2| exceeds the lower limit of condition (3), the correcting of spherical aberration and coma at the long focal length extremity cannot be made suitably.

Condition (4) specifies the ratio of the focal length of the positive third lens group 30 to the focal length of the positive fourth lens group 40.

If f3/f4 exceeds the upper limit of condition (4), the positive refractive power of the positive fourth lens group 40 becomes stronger. Consequently, it is difficult to balance the occurrences of the following aberrations, i.e., spherical aberration, coma, astigmatism and distortion.

If f3/f4 exceeds the lower limit of condition (4), the positive refractive power of the positive third lens group 30 becomes too strong. Consequently, spherical aberration in the sagittal direction largely occurs.

Condition (5) relates to the balance of the positive refractive power among the positive first lens group 10, the positive third lens group 30 and the positive fourth lens group 40, and specifies the ratio of the focal length of the positive first lens group 10 and that of the positive fourth lens group 40 to the focal length of the positive third lens group 30.

If $(f3)^2$ becomes smaller than f1×f4, the refractive power of the positive third lens group 30 in the vicinity of the diaphragm S becomes stronger. Consequently, the correcting of spherical aberration at the long focal length extremity cannot be adequately made. Here, if an attempt is made to make the refractive power of the negative second lens group 20 stronger for the correcting of spherical aberration, the correcting of distortion becomes difficult.

The positive fourth lens group 40 preferably includes three positive lens elements. Furthermore, it is preferable that at least one of the three positive lens element be bonded to a negative lens element.

More preferably, the positive fourth lens group 40 includes a positive lens element, cemented lens elements having a positive lens element and a negative lens element (or, a negative lens element and a positive lens element), and a positive lens group, in this order from the object.

The image-side positive lens group can be constituted by a single positive lens element, or by a negative lens element and a positive lens element, in this order from the object.

In the positive fourth lens group 40, it is preferable that the most object-side positive lens element satisfy the following condition:

$$70 < v_{4p} \quad (6)$$

wherein $v_{4p}$ designates the Abbe number of the most object-side positive lens element in the positive fourth lens group 40.

By satisfying condition (6), the correcting of lateral chromatic aberration can be made most effectively.

If $v_{4p}$ exceeds the lower limit of condition (6), lateral chromatic aberration largely occurs at the short focal length extremity. Consequently, sufficient optical performance cannot be secured.

In the positive fourth lens group 40, the most image-side positive lens element is preferably provided with at least one aspherical surface on which a positive refractive power becomes weaker from the center to the periphery.

It is understood that the closer an spherical surface is positioned toward the object, the more a bundle of on-axis light rays is adversely influenced by the aspherical surface. Accordingly, it is effective to provide an aspherical surface on the most image-side lens element (the final lens element). By such an aspherical surface, the correcting of aberration occurred in a bundle of off-axis light rays (coma, astigmatism and distortion, etc.) can be performed. The correcting of coma can be particularly effective by the aspherical surface on the most image-side lens element.

In the case where a strong negative lens element is provided in the positive fourth lens group 40, aberration of higher order tends to occur. Therefore the negative lens element is preferably bonded to a positive lens element. By cementing a negative lens element and a positive lens element, spherical aberration and coma, etc. occurred in the positive fourth lens group 40 are adequately corrected, and the occurrence of other aberrations can be reduced.

Furthermore, the fast zoom lens system of the present invention can be arranged to satisfy the following conditions instead of conditions (1) and (2):

$$3.5 < f1/(fw \times ft)^{1/2} < 6.5 \quad (7)$$

$$2.0 < f3/(fw \times ft)^{1/2} < 5.0 \quad (8)$$

wherein f1 designates the focal length of the positive first lens group;

f3 designates the focal length of the positive third lens group;

fw designates the focal length of the entire fast zoom lens system at the short focal length extremity; and ft designates the focal length of the entire fast zoom lens system at the long focal length extremity.

Condition (7) specifies the ratio of the focal length of the positive first lens group 10 to the geometric mean value of the focal lengths of the entire fast zoom lens system at the short and long focal length extremities.

If $f1/(fw \times ft)^{1/2}$ exceeds the upper limit of condition (7), the traveling distance of the positive first lens group 10 upon zooming becomes longer. Consequently, the overall length of the fast zoom lens system at the long focal length extremity becomes longer.

If $f1/(fw \times ft)^{1/2}$ exceeds the lower limit of condition (7), the positive refractive power of the positive first lens group 10 becomes stronger. Consequently, spherical aberration and coma largely occur at the long focal length extremity in particular.

More preferably, the fast zoom lens system satisfies the following condition:

$$4.0 < f1/(fw \times ft)^{1/2} < 6.5 \quad (7')$$

Condition (8) specifies the ratio of the focal length of the positive third lens group 30 to the geometric mean value of the focal lengths of the entire fast zoom lens system at the short and long focal length extremities.

If $f3/(fw \times ft)^{1/2}$ exceeds the upper limit of condition (8), the positive refractive power of the positive third lens group 30 becomes weaker, so that the positive refractive power of the positive fourth lens group 40 has to be stronger. Consequently, it is difficult to correct the following aberrations, i.e., spherical aberration, coma, astigmatism and distortion, in a well balanced manner.

If $f3/(fw \times ft)^{1/2}$ exceeds the lower limit of condition (8), the positive refractive power of the positive third lens group 30 becomes stronger. Consequently, spherical aberration, coma and astigmatism largely occur.

More preferably, the fast zoom lens system satisfies the following condition:

$$2.5 < f3/(fw \times ft)^{1/2} < 5.0 \quad (8')$$

Specific numerical data of the embodiments will be described hereinafter.

In the diagrams of spherical aberration and the sine condition, SA designates spherical aberration, and SC designates the sine condition.

In the diagrams of chromatic aberration (axial chromatic aberration) represented by spherical aberration the solid line and the two types of dotted lines respectively indicate spherical aberrations with respect to the d, g and C lines.

In the diagrams of lateral chromatic aberration, the two types of dotted lines respectively indicate magnification with respect to the g and C lines; however, the d line as the base line coincides with the ordinate.

In the diagrams of astigmatism, S designates the sagittal image, and M designates the meridional image.

The tables, FNO. designates the f-number, f designates the focal length of the entire zoom lens system, W designates the half angle-of-view (°), fB designates the back focal distance, r designates the radius of curvature, d designates the lens-element thickness or a distance between lens elements (lens groups) which is variable upon zooming, $N_d$, designates the refractive index of the d-line, and ν designates the Abbe number. The values for the distance "d" are indicated in the order of the short focal length extremity, an intermediate focal length and the long focal length extremity.

In addition to the above, an aspherical surface which is symmetrical with respect to the optical axis is defined as follows:

$$x = cy^2/[1+\{1-(1+K)c^2y^2\}^{1/2}] + A4y^4 + A6y^6 + A8y^8 + A10y^{10}$$

wherein:

c designates a curvature of the aspherical vertex (1/r);

y designates a distance from the optical axis;

K designates the conic coefficient; and

A4 designates a fourth-order aspherical coefficient;

A6 designates a sixth-order aspherical coefficient;

A8 designates a eighth-order aspherical coefficient; and

A10 designates a tenth-order aspherical coefficient.

Embodiment 1

FIG. 1 is the lens arrangement of the fast zoom lens system, at the short focal length extremity, according to the first embodiment of the present invention. FIGS. 2A through 2E show aberrations occurred in the lens arrangement shown in FIG. 1.

Figure 3:
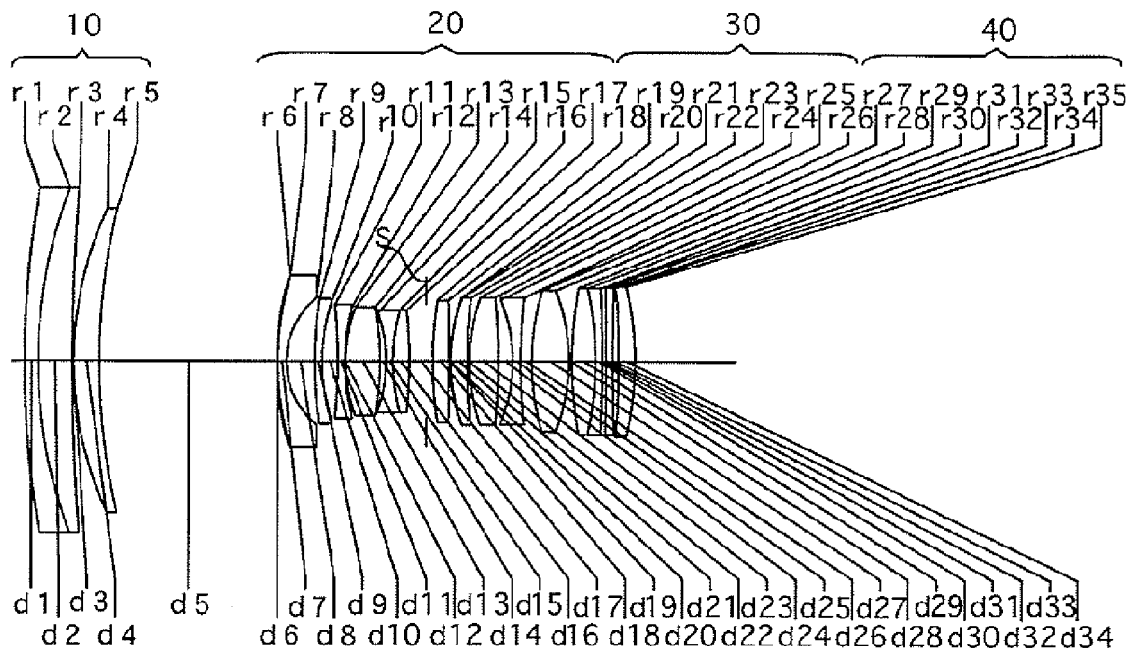
FIG. 3 is a lens arrangement of the fast zoom lens system, at the long focal length extremity, according to the first embodiment of the present invention.
Figures 4A, 4B, 4C, 4D, 4E:
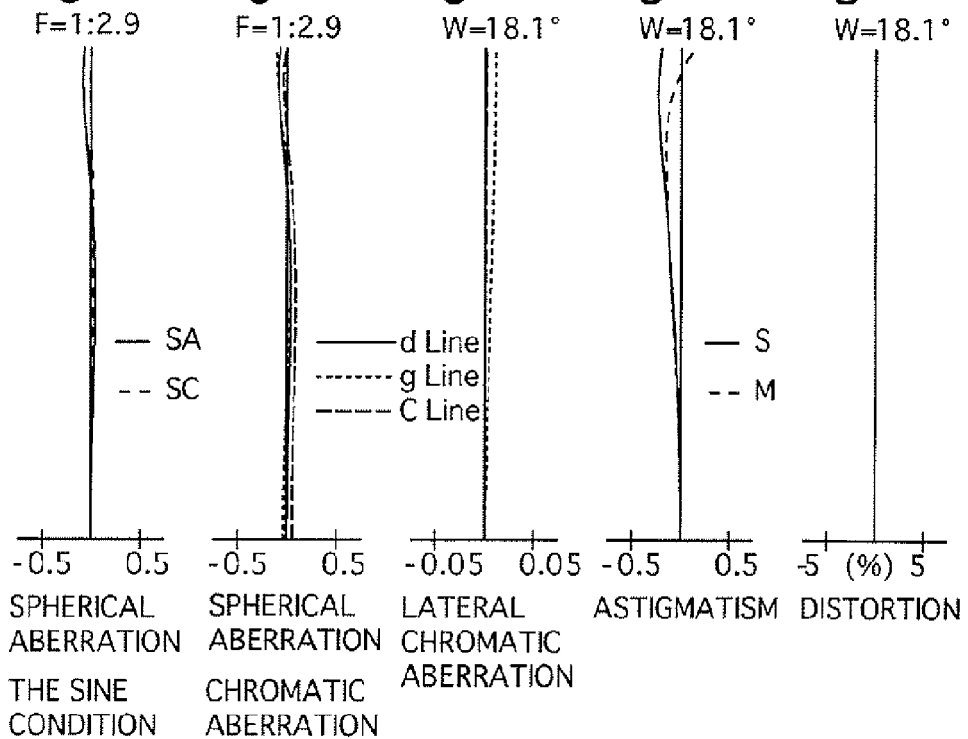
FIGS. 4A, 4B, 4C, 4D and 4E show aberrations occurred in the lens arrangement shown in FIG. 3.

FIG. 3 is the lens arrangement of the fast zoom lens system, at the long focal length extremity, according to the first embodiment of the present invention. FIGS. 4A through 4E show aberrations occurred in the lens arrangement shown in FIG. 3.

Table 1 shows the numerical data of the first embodiment.

The fast zoom lens system of the first embodiment includes a positive first lens group 10, a negative second lens group 20, a diaphragm S, a positive third lens group 30, and a positive fourth lens group 40, in this order from the object.

The positive first lens group 10 includes cemented lens elements having a negative meniscus lens element having the convex surface facing toward the object and a positive meniscus lens element having the convex surface facing toward the object, and a positive meniscus lens element having the convex surface facing toward the object, in this order from the object.

The negative second lens group 20 includes a negative meniscus lens element having the convex surface facing toward the object, another negative meniscus lens element having the convex surface facing toward the object, a negative biconcave lens element, a positive biconvex lens element, and cemented lens elements having a negative biconcave lens element and a positive biconvex lens element, in this order from the object Here, note that the object-side surface of the most object-side negative meniscus lens element is provided with an aspherical layer formed by a synthetic resin material.

The positive third lens group 30 includes a positive biconvex lens element, a positive meniscus lens element having the convex surface facing toward the object, a positive biconvex lens element, and a negative biconcave lens element, in this order from the object. Here, note that the object-side surface of the positive meniscus lens element is provided with an aspherical layer formed by a synthetic resin material.

The positive fourth lens group 40 includes a positive biconvex lens element, cemented lens elements having a positive biconvex lens element and a negative meniscus lens element having the convex surface facing toward the image, a negative biconcave lens element, and a positive planoconvex lens element, in this order from the object. Here, note that the negative biconcave lens element and the positive planoconvex lens element constitute a positive lens group having a positive combined refractive power.

The diaphragm S is provided 1.10 in front of the positive third lens group 30 (surface No. 18).

TABLE 1

F = 1:2.9-2.9-2.9
f = 16.48-28.00-43.70 (Zoom Ratio: 2.65)
W = 42.1-27.1-18.1
fB = 39.12-50.62-62.00

| Surf. No. | r | d | Nd | ν |
|---|---|---|---|---|
| 1 | 169.039 | 2.40 | 1.84666 | 23.8 |
| 2 | 83.127 | 6.18 | 1.71300 | 53.9 |
| 3 | 405.538 | 0.20 | — | — |
| 4 | 62.576 | 4.56 | 1.77250 | 49.6 |
| 5 | 115.537 | 2.60-17.28-31.46 | — | — |
| 6* | 65.590 | 0.10 | 1.52700 | 43.7 |
| 7 | 52.077 | 1.50 | 1.83476 | 42.7 |
| 8 | 14.390 | 4.98 | — | — |
| 9 | 72.874 | 1.30 | 1.82036 | 38.2 |
| 10 | 34.770 | 2.67 | — | — |
| 11 | −110.243 | 1.30 | 1.83351 | 42.9 |
| 12 | 39.111 | 0.10 | — | — |
| 13 | 27.170 | 6.02 | 1.83499 | 30.2 |
| 14 | −53.596 | 1.01 | — | — |
| 15 | −27.209 | 1.20 | 1.80401 | 46.6 |
| 16 | 34.640 | 2.82 | 1.80518 | 25.4 |
| 17 | −90.965 | 20.40-9.63-4.10 | — | — |
| 18 | 72.668 | 2.84 | 1.49700 | 81.6 |
| 19 | −646.101 | 0.20 | — | — |
| 20* | 32.050 | 0.10 | 1.52972 | 42.7 |
| 21 | 31.381 | 2.90 | 1.48749 | 70.2 |
| 22 | 98.943 | 0.40 | — | — |
| 23 | 33.974 | 5.09 | 1.48749 | 70.2 |
| 24 | −106.785 | 2.44 | — | — |
| 25 | −29.027 | 1.40 | 1.83400 | 37.2 |
| 26 | 103.423 | 5.27-3.27-2.00 | — | — |
| 27 | 43.329 | 6.56 | 1.48749 | 70.2 |
| 28 | −33.479 | 0.50 | — | — |
| 29 | 71.964 | 4.14 | 1.49700 | 81.6 |
| 30 | −58.267 | 1.20 | 1.80518 | 25.4 |
| 31 | −285.379 | 0.61 | — | — |
| 32 | −691.111 | 1.20 | 1.80804 | 33.2 |

TABLE 1-continued

F = 1:2.9-2.9-2.9
f = 16.48-28.00-43.70 (Zoom Ratio: 2.65)
W = 42.1-27.1-18.1
fB = 39.12-50.62-62.00

| Surf. No. | r | d | Nd | ν |
|---|---|---|---|---|
| 33 | 463.219 | 0.93 | — | — |
| 34* | ∞ | 3.00 | 1.69806 | 54.1 |
| 35 | −56.873 | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 6 | 0.00 | $0.98737 \times 10^{-5}$ | $-0.90407 \times 10^{-8}$ | $0.15467 \times 10^{-10}$ |
| 20 | 0.00 | $0.19799 \times 10^{-5}$ | $0.18122 \times 10^{-7}$ | — |
| 34 | 0.00 | $-0.15624 \times 10^{-4}$ | $-0.13496 \times 10^{-7}$ | $-0.25800 \times 10^{-10}$ |

Embodiment 2

Figure 5:
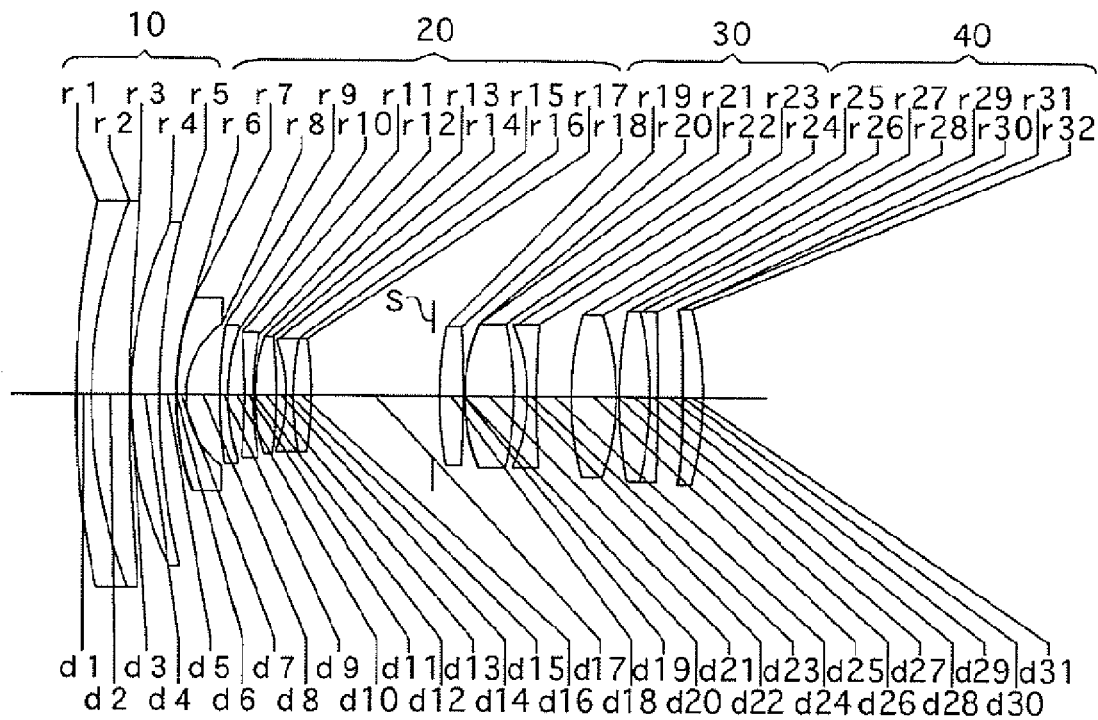
FIG. 5 is a lens arrangement of the fast zoom lens system, at the short focal length extremity, according to a second embodiment of the present invention.
Figures 6A, 6B, 6C, 6D, 6E:
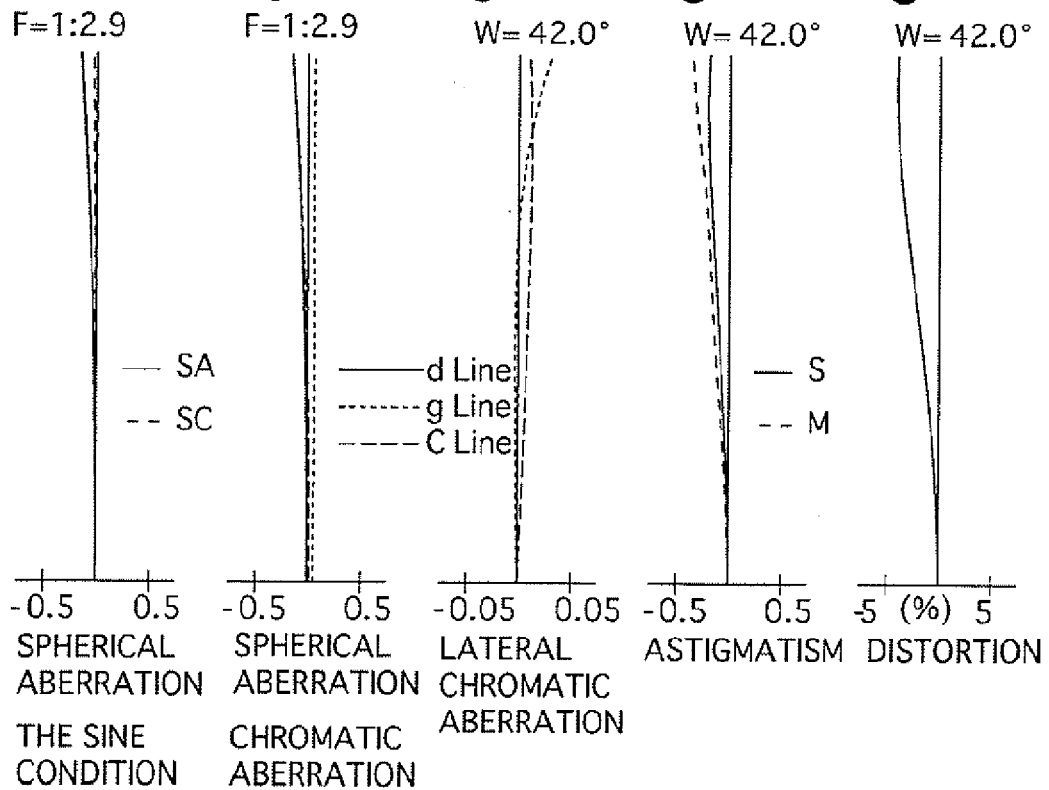
FIGS. 6A, 6B, 6C, 6D and 6E show aberrations occurred in the lens arrangement shown in FIG. 5.

FIG. 5 is the lens arrangement of the fast zoom lens system, at the short focal length extremity, according to the second embodiment of the present invention. FIGS. 6A through 6E show aberrations occurred in the lens arrangement shown in FIG. 5.

FIG. 7 is the lens arrangement of the fast zoom lens system, at the long focal length extremity, according to the second embodiment of the present invention. FIGS. 8A through SE show aberrations occurred in the lens arrangement shown in FIG. 7.

Table 2 shows the numerical data of the second embodiment.

The positive third lens group 30 includes a positive biconvex lens element, another positive biconvex lens element having an aspherical layer formed by a synthetic resin material is formed on the object-side surface thereof, and a negative biconcave lens element, in this order from the object.

The positive fourth lens group 40 includes a positive biconvex lens element, cemented lens elements having a positive biconvex lens element and a negative meniscus lens element having the convex surface facing toward the image, and a positive meniscus lens element having the convex surface facing toward the image, in this order from the object. Here, note that the object-side surface of the positive meniscus lens element is provided with an aspherical layer formed by a synthetic resin material.

The rest of the lens arrangement of the second embodiment is the same as that of the first embodiment.

The diaphragm S is provided 1.10 in front of the positive third lens group 30 (surface No. 18).

TABLE 2

F = 1:2.9-2.9-2.9
f = 16.48-28.00-43.70 (Zoom Ratio: 2.65)
W = 42.0-27.0-18.0
fB = 39.12-51.15-62.76

| Surf. No. | r | d | Nd | ν |
|---|---|---|---|---|
| 1 | 141.163 | 2.40 | 1.84666 | 23.8 |
| 2 | 80.809 | 5.95 | 1.71300 | 53.9 |
| 3 | 303.814 | 0.20 | — | — |
| 4 | 61.686 | 4.44 | 1.77250 | 49.6 |
| 5 | 108.510 | 2.60-17.01-31.39 | — | — |
| 6* | 53.312 | 0.10 | 1.52700 | 43.7 |
| 7 | 43.123 | 1.50 | 1.83481 | 42.7 |
| 8 | 13.720 | 5.30 | — | — |
| 9 | 77.012 | 1.30 | 1.83481 | 42.7 |
| 10 | 35.138 | 2.46 | — | — |
| 11 | −117.435 | 1.30 | 1.83481 | 42.7 |
| 12 | 52.810 | 0.31 | — | — |
| 13 | 29.421 | 3.38 | 1.75520 | 27.5 |
| 14 | −79.722 | 1.47 | — | — |
| 15 | −25.013 | 1.20 | 1.80400 | 46.6 |
| 16 | 50.159 | 2.81 | 1.80518 | 25.4 |
| 17 | −57.066 | 20.01-9.55-4.10 | — | — |
| 18 | 58.296 | 3.68 | 1.49700 | 81.6 |
| 19 | −215.716 | 0.20 | — | — |
| 20* | 29.453 | 0.10 | 1.52972 | 42.7 |
| 21 | 29.239 | 7.72 | 1.48749 | 70.2 |
| 22 | −46.010 | 2.10 | — | — |
| 23 | −28.147 | 1.40 | 1.83400 | 37.2 |
| 24 | 155.954 | 5.48-3.19-2.00 | — | — |
| 25 | 48.595 | 7.02 | 1.49700 | 81.6 |
| 26 | −39.282 | 0.49 | — | — |
| 27 | 72.399 | 4.83 | 1.48749 | 70.2 |
| 28 | −55.265 | 1.20 | 1.80518 | 25.4 |
| 29 | −371.641 | 3.86 | — | — |
| 30* | −4232.536 | 0.20 | 1.52972 | 42.7 |
| 31 | −145.374 | 2.98 | 1.77250 | 49.6 |
| 32 | −56.372 | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 6 | 0.00 | 0.12887×10⁻⁴ | −0.22251×10⁻⁷ | 0.51021×10⁻¹⁰ |
| 20 | 0.00 | −0.44374×10⁻⁶ | 0.16548×10⁻⁷ | −0.11870×10⁻¹⁰ |
| 30 | 0.00 | −0.17062×10⁻⁴ | −0.10719×10⁻⁷ | −0.24695×10⁻¹⁰ |

Embodiment 3

FIG. 9 is the lens arrangement of the fast zoom lens system, at the short focal length extremity, according to the third embodiment of the present invention. FIGS. 10A through 10E show aberrations occurred in the lens arrangement shown in FIG. 9.

Figure 11:
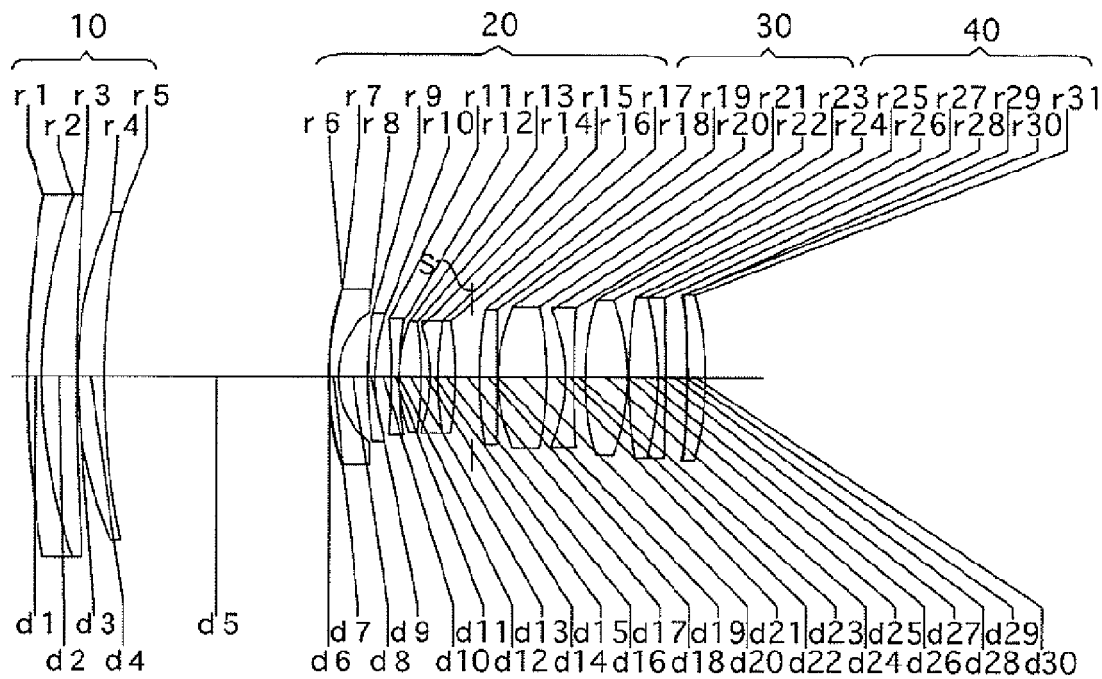
FIG. 11 is a lens arrangement of the fast zoom lens system, at the long focal length extremity, according to the third embodiment of the present invention.
Figures 12A, 12B, 12C, 12D, 12E:
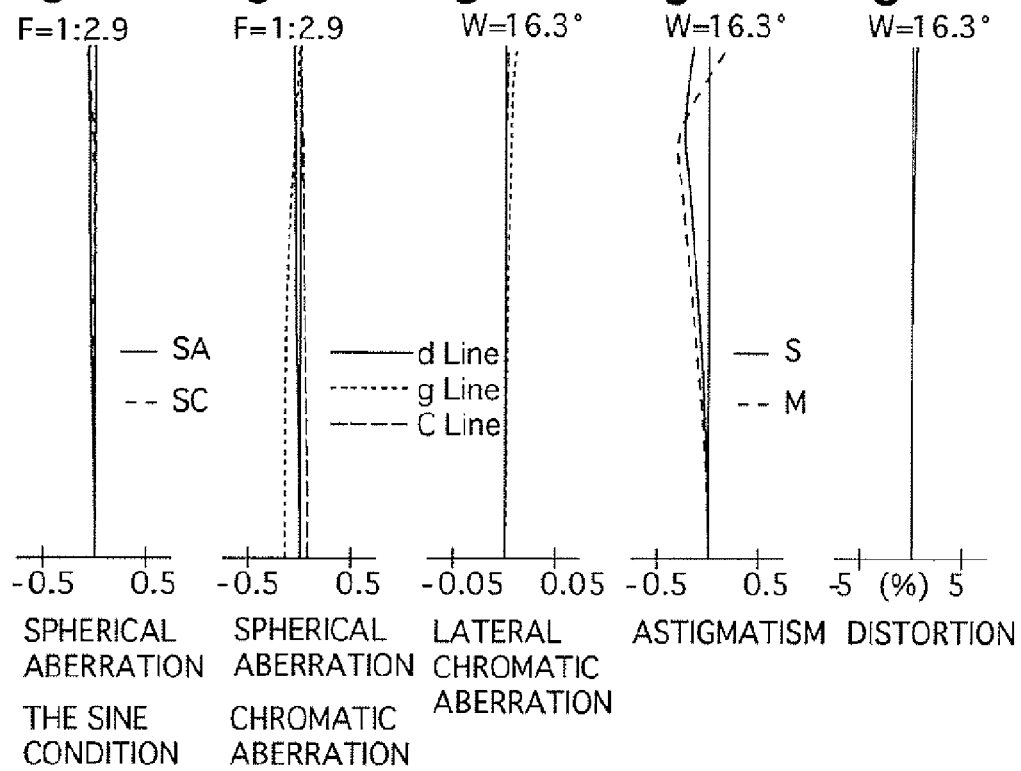
FIGS. 12A, 12B, 12C, 12D and 12E show aberrations occurred in the lens arrangement shown in FIG. 11.

FIG. 11 is the lens arrangement of the fast zoom lens system, at the long focal length extremity, according to the third embodiment of the present invention. FIGS. 12A through 12E show aberrations occurred in the lens arrangement shown in FIG. 11.

Table 3 shows the numerical data of the third embodiment.

The positive third lens group 30 includes a positive biconvex lens element, another positive biconvex lens element, and a negative biconcave lens element, in this order from the object.

The rest of the lens arrangement of the third embodiment is the same as that of the second embodiment.

The diaphragm S is provided 1.10 in front of the positive third lens group 30 (surface No. 18).

TABLE 3

F = 1:2.9-2.9-2.9
f = 16.48-29.61-48.50 (Zoom Ratio: 2.94)
W = 42.0-25.7-16.3
fB = 39.12-53.86-65.54

| Surf. No. | r | d | Nd | ν |
|---|---|---|---|---|
| 1 | 179.232 | 2.40 | 1.84666 | 23.8 |
| 2 | 91.109 | 5.80 | 1.71300 | 53.9 |
| 3 | 415.826 | 0.20 | — | — |
| 4 | 70.179 | 4.48 | 1.77250 | 49.6 |
| 5 | 137.204 | 3.10-16.99-37.90 | — | — |
| 6* | 64.415 | 0.10 | 1.52700 | 43.7 |
| 7 | 50.453 | 1.50 | 1.83481 | 42.7 |
| 8 | 14.374 | 4.90 | — | — |
| 9 | 70.866 | 1.30 | 1.83481 | 42.7 |
| 10 | 34.761 | 2.69 | — | — |
| 11 | −117.315 | 1.30 | 1.83500 | 42.7 |
| 12 | 55.240 | 0.11 | — | — |
| 13 | 28.549 | 3.60 | 1.72856 | 28.7 |
| 14 | −68.326 | 1.56 | — | — |
| 15 | −26.289 | 1.20 | 1.80399 | 46.6 |
| 16 | 57.123 | 2.98 | 1.80500 | 25.4 |
| 17 | −59.459 | 22.50-9.55-4.10 | — | — |
| 18 | 72.249 | 3.00 | 1.49700 | 81.6 |
| 19 | −2125.705 | 0.20 | — | — |
| 20* | 30.408 | 8.30 | 1.58636 | 60.9 |
| 21 | −54.693 | 3.21 | — | — |
| 22 | −27.226 | 1.30 | 1.83400 | 37.2 |
| 23 | 163.995 | 6.17-3.20-2.00 | — | — |
| 24 | 47.752 | 7.13 | 1.49700 | 81.6 |
| 25 | −36.910 | 0.20 | — | — |
| 26 | 80.484 | 4.94 | 1.48749 | 70.2 |
| 27 | −55.224 | 1.26 | 1.80518 | 25.4 |
| 28 | −606.968 | 3.53 | — | — |
| 29* | −2231.160 | 0.20 | 1.52972 | 42.7 |
| 30 | −143.173 | 3.08 | 1.77250 | 49.6 |
| 31 | −56.177 | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 6 | 0.00 | 0.12012×10⁻⁴ | −0.16830×10⁻⁷ | 0.29206×10⁻¹⁰ |
| 20 | 0.00 | −0.46460×10⁻⁶ | 0.49779×10⁻⁸ | 0.23052×10⁻¹⁰ |
| 29 | 0.00 | −0.16478×10⁻⁴ | −0.12918×10⁻⁷ | −0.23672×10⁻¹⁰ |

Embodiment 4

FIG. 13 is the lens arrangement of the fast zoom lens system, at the short focal length extremity, according to the fourth embodiment of the present invention. FIGS. 14A through 14E show aberrations occurred in the lens arrangement shown in FIG. 13.

Figure 15:
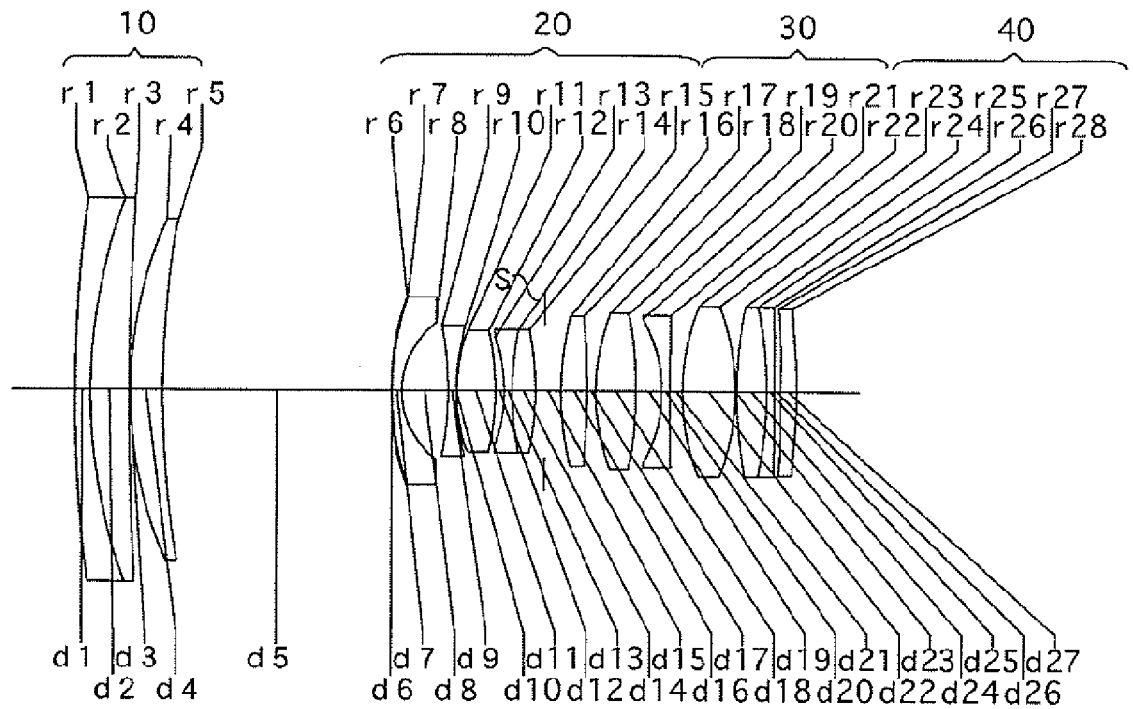
FIG. 15 is a lens arrangement of the fast zoom lens system, at the long focal length extremity, according to the fourth embodiment of the present invention.
Figures 16A, 16B, 16C, 16D, 16E:
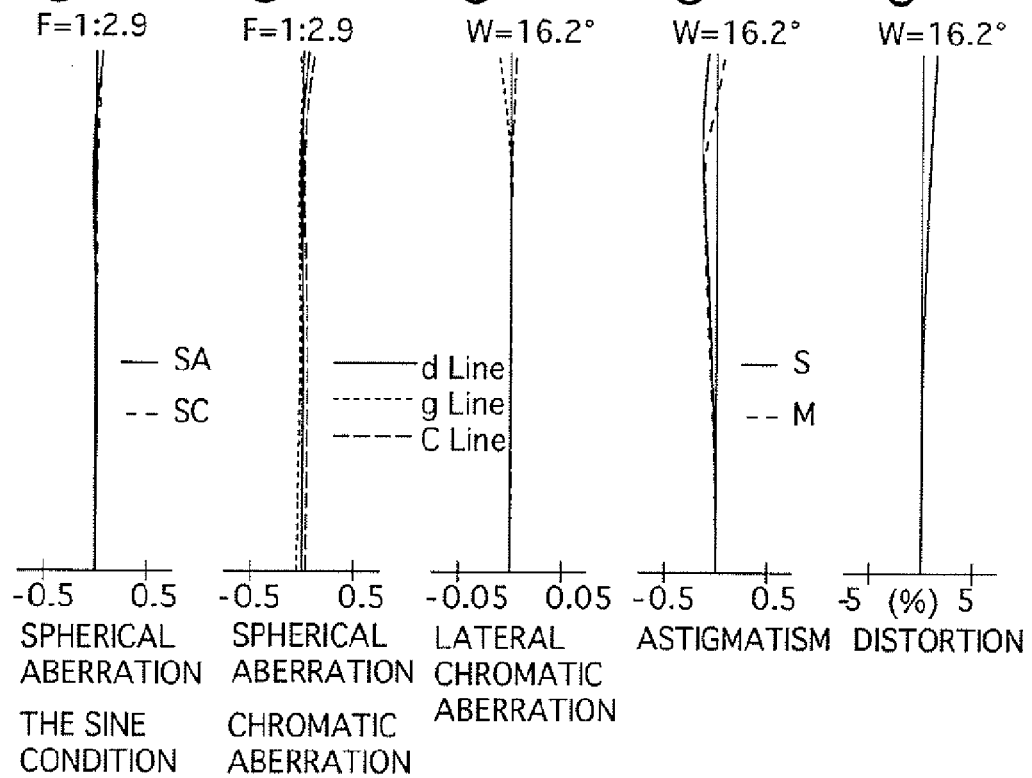
FIGS. 16A, 16B, 16C, 16D and 16E show aberrations occurred in the lens arrangement shown in FIG. 15.

FIG. 15 is the lens arrangement of the fast zoom lens system, at the long focal length extremity, according to the fourth embodiment of the present invention. FIGS. 16A through 16E show aberrations occurred in the lens arrangement shown in FIG. 15.

Table 4 shows the numerical data of the fourth embodiment.

The negative second lens group 20 includes a negative meniscus lens element having the convex surface facing toward the object, a negative biconcave lens element, a positive biconvex lens element, and cemented lens elements having a negative biconcave lens element and a positive biconvex lens element, in this order from the object. Here, note that the object-side surface of the negative meniscus lens element is provided with an aspherical layer formed by a synthetic resin material.

The positive third lens group 30 includes a positive biconvex lens element, another positive biconvex lens element and a negative biconcave lens element, in this order from the object.

The positive fourth lens group 40 includes a positive biconvex lens element, cemented lens elements having a positive biconvex lens element and a negative meniscus lens element having the convex surface facing toward the image, and a positive meniscus lens element having the convex surface facing toward the image, in this order from the object.

The rest of the lens arrangement of the fourth embodiment is the same as that of the first embodiment.

The diaphragm S is provided 2.60 in front of the positive third lens group 30 (surface No. 16).

TABLE 4

F = 1:2.9-2.9-2.9
f = 16.48-28.00-48.50 (Zoom Ratio: 2.94)
W = 42.0-26.8-16.2
fB = 39.01-50.93-65.10

| Surf. No. | r | d | Nd | ν |
|---|---|---|---|---|
| 1 | 229.819 | 2.40 | 1.84666 | 23.8 |
| 2 | 86.758 | 6.20 | 1.71300 | 53.9 |
| 3 | 490.650 | 0.20 | — | — |
| 4 | 66.686 | 5.19 | 1.77250 | 49.6 |
| 5 | 161.314 | 3.10-18.00-36.34 | — | — |
| 6* | 61.153 | 0.10 | 1.52700 | 43.7 |
| 7 | 47.580 | 1.50 | 1.83481 | 42.7 |
| 8 | 13.634 | 7.29 | — | — |
| 9 | −53.077 | 1.20 | 1.83481 | 42.7 |
| 10 | 36.117 | 0.10 | — | — |
| 11 | 26.693 | 6.15 | 1.64769 | 33.8 |
| 12 | −44.082 | 1.49 | — | — |
| 13 | −23.788 | 1.22 | 1.80400 | 46.6 |
| 14 | 49.598 | 3.68 | 1.84666 | 23.8 |
| 15 | −49.598 | 22.66-11.18-4.10 | — | — |
| 16 | 48.300 | 4.17 | 1.49700 | 81.6 |
| 17 | −147.301 | 1.38 | — | — |
| 18 | 34.681 | 6.39 | 1.58636 | 60.9 |
| 19* | −88.004 | 4.14 | — | — |
| 20 | −23.324 | 1.31 | 1.83400 | 37.2 |
| 21 | 552.315 | 5.10-3.21-2.00 | — | — |
| 22 | 37.316 | 8.47 | 1.49700 | 81.6 |
| 23 | −37.316 | 0.20 | — | — |
| 24 | 65.008 | 4.86 | 1.48749 | 70.2 |
| 25 | −65.008 | 1.20 | 1.80518 | 25.4 |
| 26 | −1420.950 | 1.07 | — | — |
| 27* | −1000.000 | 2.56 | 1.58636 | 60.9 |
| 28* | −73.838 | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 6 | 0.00 | 0.14926×10$^{-4}$ | −0.26934×10$^{-7}$ | 0.46606×10$^{-10}$ |
| 19 | 0.00 | −0.10153×10$^{-4}$ | −0.26627×10$^{-7}$ | |
| 27 | 0.00 | −0.11900×10$^{-4}$ | 0.12828×10$^{-7}$ | −0.41448×10$^{-10}$ |
| 28 | 0.00 | 0.11025×10$^{-4}$ | 0.33109×10$^{-7}$ | −0.79278×10$^{-11}$ |

Embodiment 5

FIG. 17 is the lens arrangement of the fast zoom lens system, at the short focal length extremity, according to the fifth embodiment of the present invention. FIGS. 18A through 18E show aberrations occurred in the lens arrangement shown in FIG. 17.

FIG. 19 is the lens arrangement of the fast zoom lens system, at the long focal length extremity, according to the fifth embodiment of the present invention. FIGS. 20A through 20E show aberrations occurred in the lens arrangement shown in FIG. 19.

Table 5 shows the numerical data of the fifth embodiment.

The positive fourth lens group 40 includes a positive biconvex lens element, cemented lens elements having a negative meniscus lens element having the convex surface facing toward the object and a positive biconvex lens element, and a positive meniscus lens element having the convex surface facing toward the image, in this order from the object.

The rest of the lens arrangement of the fifth embodiment is the same as that of the fourth embodiment.

The diaphragm S is provided 2.40 in front of the positive third lens group 30 (surface No. 16).

TABLE 5

F = 1:2.9-2.9-2.9
f = 16.48-28.00-48.50 (Zoom Ratio: 2.94)
W = 42.0-26.8-16.2
fB = 39.00-51.11-65.47

| Surf. No. | r | d | Nd | ν |
|---|---|---|---|---|
| 1 | 252.376 | 2.40 | 1.84666 | 23.8 |
| 2 | 96.113 | 6.24 | 1.71300 | 53.9 |
| 3 | 1178.869 | 0.20 | — | — |
| 4 | 64.274 | 4.92 | 1.77250 | 49.6 |
| 5 | 128.561 | 3.10-13.08-36.61 | — | — |
| 6* | 57.405 | 0.10 | 1.52972 | 42.7 |
| 7 | 44.290 | 1.45 | 1.83481 | 42.7 |
| 8 | 13.425 | 6.60 | — | — |
| 9 | −50.307 | 1.20 | 1.83481 | 42.7 |
| 10 | 38.535 | 0.40 | — | — |
| 11 | 27.886 | 6.33 | 1.64769 | 33.8 |
| 12 | −40.569 | 1.15 | — | — |
| 13 | −22.568 | 1.20 | 1.80400 | 46.6 |
| 14 | 52.590 | 3.43 | 1.84666 | 23.8 |
| 15 | −52.590 | 21.35-10.54-3.90 | — | — |
| 16 | 53.231 | 3.86 | 1.49700 | 81.6 |
| 17 | −109.498 | 0.81 | — | — |
| 18 | 33.281 | 6.59 | 1.58636 | 60.9 |
| 19* | −70.753 | 4.37 | — | — |
| 20 | −22.486 | 1.25 | 1.83400 | 37.2 |
| 21 | 2576.841 | 5.67-3.36-2.00 | — | — |
| 22 | 37.054 | 7.71 | 1.49700 | 81.6 |
| 23 | −37.054 | 0.20 | — | — |
| 24 | 30214.658 | 1.20 | 1.80518 | 25.4 |
| 25 | 66.294 | 4.50 | 1.48749 | 70.2 |
| 26 | −66.294 | 0.30 | — | — |

TABLE 5-continued

F = 1:2.9-2.9-2.9
f = 16.48-28.00-48.50 (Zoom Ratio: 2.94)
W = 42.0-26.8-16.2
fB = 39.00-51.11-65.47

| Surf. No. | r | d | Nd | ν |
|---|---|---|---|---|
| 27* | −500.000 | 3.73 | 1.58636 | 60.9 |
| 28* | −69.895 | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 6 | 0.00 | $0.17237 \times 10^{-4}$ | $-0.35923 \times 10^{-7}$ | $0.86357 \times 10^{-10}$ |
| 19 | 0.00 | $-0.87520 \times 10^{-5}$ | $-0.27625 \times 10^{-7}$ | |
| 27 | 0.00 | $-0.19706 \times 10^{-4}$ | $-0.14970 \times 10^{-7}$ | $0.99911 \times 10^{-10}$ |
| 28 | 0.00 | $0.12475 \times 10^{-5}$ | $0.81231 \times 10^{-8}$ | $0.13513 \times 10^{-9}$ |

Embodiment 6

FIG. 21 is the lens arrangement of the fast zoom lens system, at the short focal length extremity, according to the sixth embodiment of the present invention. FIGS. 22A through 22E show aberrations occurred in the lens arrangement shown in FIG. 21.

Figures 23, 24A, 24B, 24C, 24D, 24E:
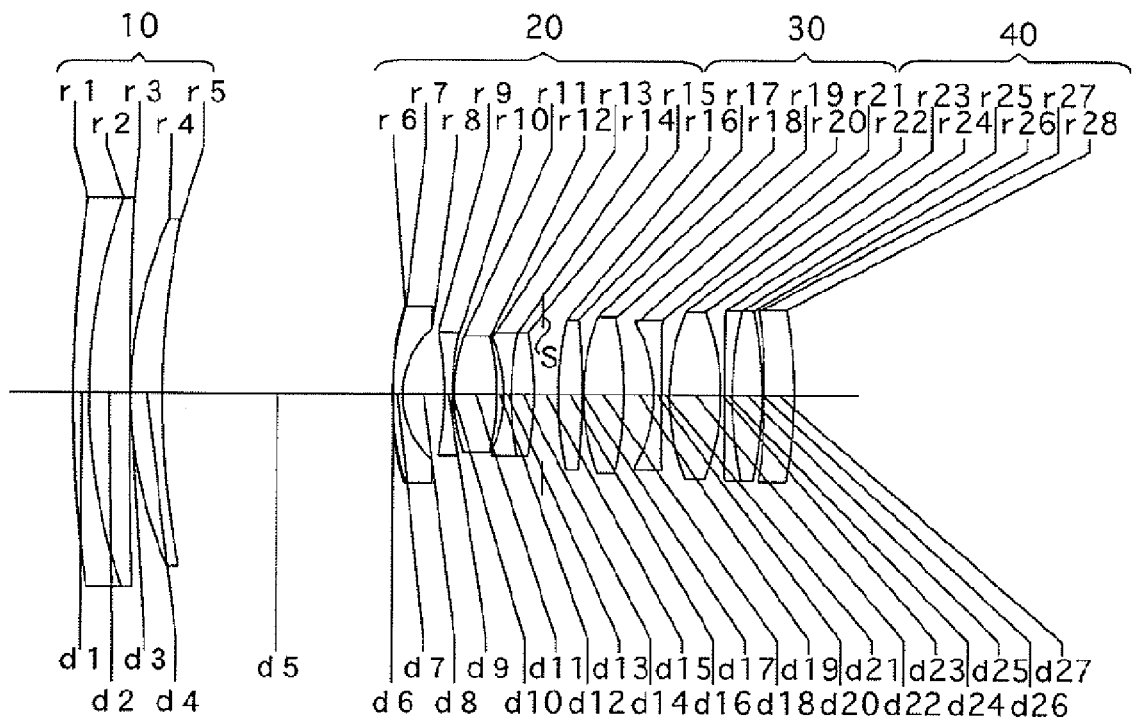
FIG. 23 is a lens arrangement of the fast zoom lens system, at the long focal length extremity, according to the sixth embodiment of the present invention.
FIGS. 24A, 24B, 24C, 24D and 24E show aberrations occurred in the lens arrangement shown in FIG. 23.

FIG. 23 is the lens arrangement of the fast zoom lens system, at the long focal length extremity, according to the sixth embodiment of the present invention. FIGS. 24A through 24E show aberrations occurred in the lens arrangement shown in FIG. 23.

Table 6 shows the numerical data of the sixth embodiment.

The basic lens arrangement of the sixth embodiment is the same as that of the fifth embodiment.

The diaphragm S is provided 2.40 in front of the positive third lens group 30 (surface No. 16).

TABLE 6

F = 1:2.9-2.9-2.9
f = 16.48-28.00-48.50 (Zoom Ratio: 2.94)
W = 42.0-26.7-16.2
fB = 39.00-50.99-65.07

| Surf. No. | r | d | Nd | ν |
|---|---|---|---|---|
| 1 | 228.853 | 2.40 | 1.84666 | 23.8 |
| 2 | 90.908 | 6.36 | 1.71300 | 53.9 |
| 3 | 868.199 | 0.20 | — | — |
| 4 | 66.977 | 4.95 | 1.77250 | 49.6 |
| 5 | 143.503 | 3.10-17.89-36.27 | — | — |
| 6* | 69.698 | 0.10 | 1.52972 | 42.7 |
| 7 | 50.745 | 1.45 | 1.83481 | 42.7 |
| 8 | 13.792 | 6.68 | — | — |
| 9 | −48.189 | 1.20 | 1.83481 | 42.7 |
| 10 | 44.128 | 0.34 | — | — |
| 11 | 29.394 | 6.70 | 1.64769 | 33.8 |
| 12 | −39.787 | 1.14 | — | — |
| 13 | −22.186 | 1.20 | 1.80400 | 46.6 |
| 14 | 50.962 | 3.51 | 1.84666 | 23.8 |
| 15 | −50.962 | 20.76-10.31-3.90 | — | — |
| 16 | 55.754 | 3.71 | 1.49700 | 81.6 |
| 17 | −122.733 | 0.20 | — | — |
| 18 | 34.402 | 6.40 | 1.58636 | 60.9 |
| 19* | −67.745 | 4.82 | — | — |
| 20 | −22.339 | 1.25 | 1.83400 | 37.2 |
| 21 | 719.208 | 5.39-2.80-1.27 | — | — |
| 22 | 35.999 | 8.16 | 1.49700 | 81.6 |
| 23 | −35.999 | 0.62 | — | — |
| 24 | 1796.044 | 1.20 | 1.80518 | 25.4 |
| 25 | 62.947 | 4.67 | 1.48749 | 70.2 |
| 26 | −62.947 | 0.30 | — | — |
| 27* | −500.000 | 4.77 | 1.58636 | 60.9 |
| 28* | −65.096 | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 6 | 0.00 | $0.17834 \times 10^{-4}$ | $-0.24983 \times 10^{-7}$ | $0.84108 \times 10^{-10}$ |
| 19 | 0.00 | $-0.67065 \times 10^{-5}$ | $-0.27300 \times 10^{-7}$ | |
| 27 | 0.00 | $-0.20218 \times 10^{-4}$ | $-0.27300 \times 10^{-7}$ | $0.10251 \times 10^{-9}$ |
| 28 | 0.00 | $-0.16910 \times 10^{-6}$ | $-0.41153 \times 10^{-8}$ | $0.14111 \times 10^{-9}$ |

The numerical values of each condition for each embodiment are shown in Table 7.

TABLE 7

| | Embod. 1 | Embod. 2 | Embod. 3 |
|---|---|---|---|
| Condition (1) | 8.12 | 7.99 | 8.62 |
| Condition (2) | 7.64 | 6.55 | 6.76 |
| Condition (3) | 8.39 | 8.64 | 8.68 |
| Condition (4) | 4.52 | 3.63 | 3.71 |
| Condition (5) | 0.24 | 0.34 | 0.34 |
| Condition (6) | 70.2 | 81.6 | 81.6 |
| Condition (7) | 4.99 | 4.91 | 5.02 |
| Condition (8) | 4.69 | 4.02 | 3.94 |

| | Embod. 4 | Embod. 5 | Embod. 6 |
|---|---|---|---|
| Condition (1) | 7.99 | 8.06 | 7.89 |
| Condition (2) | 6.30 | 4.83 | 5.62 |
| Condition (3) | 8.26 | 8.62 | 8.40 |
| Condition (4) | 3.56 | 2.65 | 3.19 |
| Condition (5) | 0.36 | 0.63 | 0.44 |
| Condition (6) | 81.6 | 81.6 | 81.6 |
| Condition (7) | 4.66 | 4.70 | 4.60 |
| Condition (8) | 3.67 | 2.82 | 3.27 |

Here, note that Condition (5) indicates the values of f1×f4/(f3×f3), since condition (5) is satisfied when f1×f4/(f3×f3) becomes less than 1, i.e., f1×f4/(f3×f3)<1

As can be understood from Table 7, the first through sixth embodiments satisfy conditions (1) through (8). Furthermore, as can be understood from the aberration diagrams, the various aberrations are adequately corrected.

According to the above descriptions a small and high-quality fast zoom lens system of a four-lens-group arrangement, i.e., a positive first lens group, a negative second lens group, a positive third lens group and a positive fourth lens group, in this order from the object, which is suitable for a digital SLR camera, can be attained. The fast zoom lens system can achieve the following features;

an angle-of-view of approximately 85° at the short focal length extremity and approximately 32° at the long focal length extremity;

a zoom ratio of approximately 2.6 to 3; and a longer back focal distance.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A fast zoom lens system comprises a positive first lens group, a negative second lens group, a positive third lens group and a positive fourth lens group, in this order from an object,
    wherein upon zooming from the short focal length extremity to the long focal length extremity, a distance between said positive first lens group and said negative second lens group increases, a distance between said negative second lens group and said positive third lens group decreases, and a distance between said positive third lens group and said positive fourth lens group decreases;
    wherein said fast zoom lens system satisfies the following conditions:

$6.0 < f1/fw < 10.0$ $3.0 < f3/fw < 8.0$ wherein
    f1 designates the focal length of said positive first lens group;
    f3 designates the focal length of said positive third lens group; and
    fw designates the focal length of the entire fast zoom lens system at the short focal length extremity;
    wherein said positive fourth lens group comprises three positive lens elements, and wherein at least one of said three positive lens elements is bonded to a negative lens element.

2. The fast zoom lens system according to claim 1, wherein said positive fourth lens group comprises a positive lens element, cemented lens elements having a positive lens element and a negative lens element, or, having a negative lens element and a positive lens element, and a positive lens group, in this order from the object.

3. The fast zoom lens system according to claim 1, wherein the most image-side lens element of said positive fourth lens group comprises a positive lens element having at least one aspherical surface thereon.

4. A fast zoom lens system comprises a positive first lens group, a negative second lens group, a positive third lens group and a positive fourth lens group, in this order from an object,
    wherein upon zooming from the short focal length extremity to the long focal length extremity, a distance between said positive first lens group and said negative second lens group increases, a distance between said negative second lens group and said positive third lens group decreases, and a distance between said positive third lens group and said positive fourth lens group decreases;
    wherein said fast zoom lens system satisfies the following conditions:

$7.0 < |f1/f2| < 10.0$ $2.0 < f3/f4 < 5.0$ wherein
    f1 designates the focal length of said positive first lens group;
    f2 designates the focal length of said negative second lens group;
    f3 designates the focal length of said positive third lens group; and
    f4 designates the focal length of said positive fourth lens group.

5. The fast zoom lens system according to claim 4, further satisfying the following condition:

$f1 \times f4 < (f3)^2$ wherein
    f1 designates the focal length of said positive first lens group;
    f3 designates the focal length of said positive third lens group; and
    f4 designates the focal length of said positive fourth lens group.

6. The fast zoom lens system according to claim 4, wherein said positive fourth lens group comprises three positive lens elements, and wherein at least one of said three positive lens element is bonded to a negative lens element.

7. The fast zoom lens system according to claim 6, wherein said positive fourth lens group comprises a positive lens element, cemented lens elements having a positive lens element and a negative lens element, or, having a negative lens element and a positive lens element, and a positive lens group, in this order from the object.

8. The fast zoom lens system according to claim 6, wherein the most image-side lens element of said positive fourth lens group comprises a positive lens element having at least one aspherical surface thereon.

9. A fast zoom lens system comprises a positive first lens group, a negative second lens group, a positive third lens group and a positive fourth lens group, in this order from an object,
    wherein upon zooming from the short focal length extremity to the long focal length extremity, a distance between said positive first lens group and said negative second lens group increases, a distance between said negative second lens group and said positive third lens group decreases, and a distance between said positive third lens group and said positive fourth lens group decreases;
    wherein said fast zoom lens system satisfies the following condition:

$f1 \times f4 < (f3)^2$ wherein
    f1 designates the focal length of said positive first lens group;
    f3 designates the focal length of said positive third lens group; and
    f4 designates the focal length of said positive fourth lens group.

10. The fast zoom lens system according to claim 9, wherein said positive fourth lens group comprises three positive lens elements, and wherein at least one of said three positive lens element is bonded to a negative lens element.

11. The fast zoom lens system according to claim 10, wherein said positive fourth lens group comprises a positive lens element, cemented lens elements having a positive lens element and a negative lens element, or, having a negative lens element and a positive lens element, and a positive lens group, in this order from the object.

12. The fast zoom lens system according to claim 10, wherein the most image-side lens element of said positive fourth lens group comprises a positive lens element having at least one aspherical surface thereon.

* * * * *